(12) United States Patent
Orsino

(10) Patent No.: US 12,262,435 B2
(45) Date of Patent: Mar. 25, 2025

(54) SIDELINK RLF HANDLING

(71) Applicant: Telefonaktiebolaget LM Ericsson (publ), Stockholm (SE)

(72) Inventor: Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 480 days.

(21) Appl. No.: 17/637,656

(22) PCT Filed: Aug. 13, 2020

(86) PCT No.: PCT/EP2020/072800
§ 371 (c)(1),
(2) Date: Feb. 23, 2022

(87) PCT Pub. No.: WO2021/037583
PCT Pub. Date: Mar. 4, 2021

(65) Prior Publication Data
US 2022/0279617 A1    Sep. 1, 2022

Related U.S. Application Data

(60) Provisional application No. 62/891,028, filed on Aug. 23, 2019.

(51) Int. Cl.
*H04W 76/00*   (2018.01)
*H04W 76/19*   (2018.01)
(Continued)

(52) U.S. Cl.
CPC ........... *H04W 76/19* (2018.02); *H04W 76/30* (2018.02); *H04W 92/18* (2013.01)

(58) Field of Classification Search
CPC ..... H04W 76/19; H04W 76/30; H04W 92/18; H04W 76/15
See application file for complete search history.

(56) References Cited

U.S. PATENT DOCUMENTS

| 2014/0155114 A1* | 6/2014 | Wu ........... H04W 36/03 455/509 |
| 2015/0133122 A1* | 5/2015 | Chen ......... H04W 36/04 455/436 |

(Continued)

OTHER PUBLICATIONS

Examination Report for Indian Patent Application No. 202247011479, mailed Jul. 27, 2022, 5 pages.

(Continued)

*Primary Examiner* — Brandon M Renner
(74) *Attorney, Agent, or Firm* — Withrow & Terranova, PLLC

(57) ABSTRACT

Sidelink (SL) Radio Link Failure (RLF) handling in Multi-Radio Dual Connectivity (MR-DC) scenarios is provided. Systems and methods are disclosed herein for handling SL RLF detection and declaration for an SL unicast link in MR-DC scenarios. In some embodiments, when an RLF is detected on one of a pair of SL User Equipments (UEs), a message is sent to a primary or secondary node to notify a serving network about the failure. In this case, either the primary node or secondary node may try to reconfigure the SL UEs, thus guaranteeing SL service continuity. Further, in some embodiments, once the network is informed that the SL radio channel has failed, the SL service continuity may be guaranteed by a Master Node (MN)-Secondary Node (SN) coordination regarding the SL configuration and connectivity handling (e.g., resource coordination, mode transmission, and so on).

8 Claims, 14 Drawing Sheets

(51) Int. Cl.
*H04W 76/30* (2018.01)
*H04W 92/18* (2009.01)

(56) References Cited

U.S. PATENT DOCUMENTS

| | | | | |
|---|---|---|---|---|
| 2015/0223282 | A1 | 8/2015 | Vajapeyam et al. | |
| 2015/0282243 | A1 | 10/2015 | Lei et al. | |
| 2019/0159084 | A1* | 5/2019 | Wu | H04W 72/23 |
| 2020/0236730 | A1* | 7/2020 | Shin | H04W 56/001 |
| 2020/0252989 | A1* | 8/2020 | Chen | H04W 76/19 |
| 2020/0351730 | A1* | 11/2020 | Park | H04W 56/0045 |
| 2020/0351975 | A1* | 11/2020 | Tseng | H04W 76/23 |
| 2021/0195675 | A1* | 6/2021 | Park | H04W 76/19 |
| 2021/0385897 | A1* | 12/2021 | Purkayastha | H04W 76/18 |

OTHER PUBLICATIONS

Author Unknown, "Technical Specification Group Radio Access Network; Evolved Universal Terrestrial Radio Access (E-UTRA); Base Station (BS) radio transmission and reception (Release 16)," Technical Specification 36.104, Version 16.2.0, Jun. 2019, 3GPP Organizational Partners, 265 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.6.0, Jun. 2019, 3GPP Organizational Partners, 365 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.6.0, Jun. 2019, 3GPP Organizational Partners, 960 pages.

Author Unknown, "Technical Specification Group Radio Access Network; NR; Base Station (BS) radio transmission and reception (Release 16)," Technical Specification 38.104, Version 16.0.0, Jun. 2019, 3GPP Organizational Partners, 228 pages.

Author Unknown, "Technical Specification Group Radio Access Network; NR; Requirements for support of radio resource management (Release 15)," Technical Specification 38.133, Version 15.6.0, Jun. 2019, 3GPP Organizational Partners, 999 pages.

Author Unknown, "Technical Specification Group Radio Access Network; NR; NR and NG-RAN Overall Description; Stage 2 (Release 15)," Technical Specification 38.300, Version 15.6.0, Jun. 2019, 3GPP Organizational Partners, 99 pages.

Author Unknown, "Technical Specification Group Radio Access Network; NR; User Equipment (UE) procedures in Idle mode and RRC Inactive state (Release 15)," Technical Specification 38.304, Version 15.4.0, Jun. 2019, 3GPP Organizational Partners, 29 pages.

Author Unknown, "Technical Specification Group Radio Access Network; NR; Medium Access Control (MAC) protocol specification (Release 15)," Technical Specification 38.321, Version 15.6.0, Jun. 2019, 3GPP Organizational Partners, 78 pages.

Author Unknown, "Technical Specification Group Radio Access Network; NR; Radio Link Control (RLC) protocol specification (Release 15)," Technical Specification 38.322, Version 15.5.0, Mar. 2019, 3GPP Organizational Partners, 33 pages.

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.

Ericsson, "R2-1901707: On NR sidelink link management for unicast," 3GPP TSG-RAN WG2 #105, Feb. 25-Mar. 1, 2019, Athens, Greece, 2 pages.

Ericsson, "R2-1910133: RLF handling in sidelink," 3GPP TSG-RAN WG2 #107, Aug. 26-30, 2019, Prague, Czech Republic, 6 pages.

Interdigital Inc., "R2-1901579: RLM/RLF and RRM for NR V2X," 3GPP RAN WG2 Meeting #105, Feb. 25-Mar. 1, 2019, Athens, Greece, 6 pages.

International Search Report and Written Opinion for International Patent Application No. PCT/EP2020/072800, mailed Nov. 4, 2020, 10 pages.

Intention to Grant for European Patent Application No. 20757301.5, mailed Mar. 13, 2024, 7 pages.

Hearing Notice for Indian Patent Application No. 202247014749, mailed Jun. 6, 2024, 3 pages.

\* cited by examiner

LTE and NR interworking options

Control plane architecture for dual connectivity in LTE DC and EN-DC

Network side protocol termination options for MCG, SCG, and split bearers in MR-DC with EPC (EN-DC)

Network architecture for control plane in EN-DC

C-ITS environment

Radio link failure due to physical layer problems

*NR SL unicast links between two UEs*

*Link release procedure*

SIDELINK RLF HANDLING

This application is a 35 U.S.C. § 371 national phase filing of International Application No. PCT/EP2020/072800, filed Aug. 13, 2020, which claims the benefit of provisional patent application Ser. No. 62/891,028, filed Aug. 23, 2019, the disclosures of which are incorporated herein by reference in their entireties.

TECHNICAL FIELD

The present disclosure relates to recovery from Radio Link Failure (RLF) in wireless communications networks.

BACKGROUND

In Third Generation Partnership Project (3GPP), the Dual Connectivity (DC) solution has been specified, both for Long Term Evolution (LTE) and between LTE and Fifth Generation (5G) New Radio (NR). In DC, two nodes are involved, a Master Node (MN, or Master enhanced or evolved Node B (eNB) (MeNB)) and a Secondary Node (SN, or Secondary eNB (SeNB)). Multi-Connectivity (MC) is the case when there are more than two nodes involved. Also, it has been proposed in 3GPP that DC is used in Ultra Reliable Low Latency Communications (URLLC) cases in order to enhance robustness and to avoid connection interruptions.

3GPP DC

FIG. 1 illustrates different ways to deploy a 5G NR network with or without interworking with LTE radio access (also referred to as Evolved Universal Terrestrial Radio Access (E-UTRA)) and an Evolved Packet Core (EPC). In principle, NR and LTE can be deployed without any interworking, denoted by NR Stand-Alone (SA) operation. That is, the NR base station (gNB) in NR can be connected to a 5G Core Network (CN) (5GCN) and the eNB in LTE can be connected to the EPC with no interconnection between the two (Option 1 and Option 2 in FIG. 1). On the other hand, the first supported version of NR is the so-called Evolved Universal Terrestrial Radio Access Network (E-UTRAN) NR DC (EN-DC), illustrated by Option 3 in FIG. 1. In such a deployment, DC between NR and LTE is applied with LTE as the master and NR as the secondary node. The Radio Access Network (RAN) node (e.g., gNB) supporting NR may not have a control plane connection to the core network (e.g., EPC); instead, it relies on LTE as the MN (MeNB). This is also called "Non-standalone NR." Notice that, in this case, the functionality of an NR cell is limited and would be used for connected mode User Equipments (UEs) as a booster and/or diversity leg, but an RRC_IDLE UE cannot camp on these NR cells.

With introduction of 5GCN, other options may also be valid. As mentioned above, Option 2 supports standalone NR deployment where the gNB is connected to the 5GCN. Similarly, LTE can also be connected to the 5GCN using Option 5 (also known as enhanced LTE (eLTE), E-UTRA/5GCN, or LTE/5GCN and the node can be referred to as a Next Generation eNB (NG-eNB)). In these cases, both NR and LTE are seen as part of the Next Generation RAN (NG-RAN) (and both the NG-eNB and the gNB can be referred to as NG-RAN nodes). It is worth noting that Option 4 and Option 7 are other variants of DC between LTE and NR which will be standardized as part of NG-RAN connected to 5GCN, denoted by Multi-Radio DC (MR-DC). Under the MR-DC umbrella are the following:

EN-DC (Option 3): LTE is the MN and NR is the SN (EPC CN employed), NR E-UTRA DC (NE-DC) (Option 4): NR is the MN and LTE is the SN (5GCN employed), NG-RAN E-UTRA NR DC (NGEN-DC) (Option 7): LTE is the MN and NR is the SN (5GCN employed), NR-DC (variant of Option 2): DC where both the MN and the SN are NR (5GCN employed).

As migration for these options may differ for different operators, it is possible to have deployments with multiple options in parallel in the same network. For example, there could be an eNB supporting Options 3, 5, and 7 in the same network as an NR base station supporting Options 2 and 4. In combination with DC solutions between LTE and NR, it is also possible to support Carrier Aggregation (CA) in each cell group (i.e., Master Cell Group (MCG) and Secondary Cell Group (SCG)) and DC between nodes on the same Radio Access Technology (RAT) (e.g., NR—NR DC). For the LTE cells, a consequence of these different deployments is the coexistence of LTE cells associated to eNBs connected to EPC, 5GCN, or both EPC/5GCN.

As stated earlier, DC is standardized for both LTE and EN-DC. LTE DC and EN-DC are designed differently when it comes to which nodes control what. Basically, there are two options:

1. Centralized solution (like LTE DC),
2. Decentralized solution (like EN-DC).

FIG. 2 shows a schematic control plane architecture 200-1 for DC in LTE DC and a control plane architecture 200-2 for EN-DC. In the control plane architecture 200-1 for LTE DC, a MN 202 has an LTE Radio Resource Control (RRC) entity (LTE RRC) 204 to control a UE 206 (which stores an LTE RRC state 208). The MN 202 communicates with a SN 210-1 over an Xn-C interface. The UE 206 communicates with both the MN 202 and the SN 210-1 over a Uu interface.

The main difference in the control plane architecture 200-2 for EN-DC is that a SN 210-2 has a separate NR RRC entity (NR RRC) 212. This means that the SN 210-2 can also control the UE 206, sometimes without the knowledge of the MN 202 but often the SN 210-2 needs to coordinate with the MN 202. The MN 202 communicates with the SN 210-2 over an Xx-C interface. In the control plane architecture 200-1 for LTE DC, the RRC decisions are always coming from the MN 202 (MN to UE). Note, however, that the SN 210-1 still decides the configuration of the SN 210-1 since it is only the SN 210-1 itself that has knowledge of the resources, capabilities, etc. of the SN 210-1.

For EN-DC, the major changes compared to LTE DC are:
the introduction of a split bearer from the SN 210-2 (known as an SCG split bearer),
the introduction of a split bearer for RRC, and
the introduction of a direct RRC from the SN 210-2 (also referred to as an SCG Signaling Radio Bearer (SRB)).

FIGS. 3 and 4 show User Plane (UP) 300 and Control Plane (CP) 400 architectures for EN-DC. In particular, FIG. 3 illustrates network side protocol termination options for MCG, SCG, and split bearers in MR-DC with EPC (EN-DC). FIG. 4 illustrates a network architecture for CP 400 in EN-DC.

The SN 210 is sometimes referred to as a Secondary gNB (SgNB) (where gNB is an NR base station), and the MN 202 as MeNB in case the LTE is the MN 202 and NR is the SN 210. In the other case where NR is the MN 202 and LTE is the SN 210, the corresponding terms are SeNB and Master gNB (MgNB).

Split RRC messages are mainly used for creating diversity, and the sender can decide to either choose one of the links for scheduling the RRC messages or it can duplicate the message over both links. In the downlink, the path switching between the MCG or SCG legs or duplication on both is left to network implementation. On the other hand, for the uplink, the network configures the UE to use the MCG, SCG, or both legs. The terms "leg," "path," and "Radio Link Control (RLC) bearer" are used interchangeably throughout this document.

Inter-Node RRC Messages

Inter-node RRC messages are RRC messages that are sent either across the X2-, Xn-, or the NG-interface, either to or from the gNB, i.e. a single 'logical channel' is used for all RRC messages transferred across network nodes. The information could originate from or be destined for another RAT.

The following excerpts are from 3GPP Technical Specification (TS) 38.331 V15.6.0.

```
11.2.2 Message Definitions
    * * * * *
-   CG-Config
This message is used to transfer the SCG radio configuration as generated by the SgNB or
SeNB.
        Direction: Secondary gNB or eNB to master gNB or eNB.
        CG-Config message
-- ASN1START
-- TAG-CG-CONFIG-START
CG-Config ::=                          SEQUENCE {
    criticalExtensions                          CHOICE {
        c1                                      CHOICE{
            cg-Config                           CG-Config-IEs,
            spare3 NULL, spare2 NULL, spare1 NULL
        },
        criticalExtensionsFuture                SEQUENCE { }
    }
}
CG-Config-IEs ::=                       SEQUENCE {
    scg-CellGroupConfig                     OCTET STRING (CONTAINING RRCReconfiguration)
OPTIONAL,
    scg-RB-Config                           OCTET STRING (CONTAINING RadioBearerConfig)
OPTIONAL,
    configRestrictModReq                    ConfigRestrictModReqSCG
OPTIONAL,
    drx-InfoSCG                             DRX-Info
OPTIONAL,
    candidateCellInfoListSN                 OCTET STRING (CONTAINING MeasResultList2NR)
OPTIONAL,
    measConfigSN                            MeasConfigSN
OPTIONAL,
    selectedBandCombination                 BandCombinationInfoSN
OPTIONAL,
    fr-InfoListSCG                          FR-InfoList                 OPTIONAL,
    candidateServingFreqListNR              CandidateServingFreqListNR  OPTIONAL,
    nonCriticalExtension                    CG-Config-v1540-IEs         OPTIONAL
}
CG-Config-v1540-IEs ::=                 SEQUENCE {
    pSCellFrequency                         ARFCN-ValueNR
OPTIONAL,
    reportCGI-RequestNR                     SEQUENCE {
        requestedCellInfo                       SEQUENCE {
            ssbFrequency                            ARFCN-ValueNR,
            cellForWhichToReportCGI                 PhysCellId
        }
OPTIONAL
    }
OPTIONAL,
    ph-InfoSCG                              PH-TypeListSCG
OPTIONAL,
    nonCriticalExtension                    CG-Config-v1560-IEs
OPTIONAL
}
CG-Config-v1560-IEs ::=                 SEQUENCE {
    pSCellFrequencyEUTRA                    ARFCN-ValueEUTRA
OPTIONAL,
    scg-CellGroupConfig-EUTRA               OCTET STRING
OPTIONAL,
    candidateCellInfoListSN-EUTRA           OCTET STRING
OPTIONAL,
    candidateServing-FreqListEUTRA          CandidateServing-FreqListEUTRA
OPTIONAL,
    needForGaps                             ENUMERATED {true}
OPTIONAL,
    drx-Config-SCG                          DRX-Config
OPTIONAL,
    reportCGI-RequestEUTRA                  SEQUENCE {
        requestedCellInfoEUTRA                  SEQUENCE {
```

```
                eutraFrequency                      ARFCN-ValueEUTRA,
                cellForWhichToReportCGI-EUTRA       EUTRA-PhysCellId
            }
    OPTIONAL
        }
    OPTIONAL,
        nonCriticalExtension                SEQUENCE { }
    OPTIONAL
    }
PH-TypeListSCG ::=                          SEQUENCE (SIZE (1..maxNrofServing-Cells)) OF PH-InfoSCG
PH-InfoSCG ::=                              SEQUENCE {
    servCellIndex                               ServCellIndex,
    ph-Uplink                                   PH-UplinkCarrierSCG,
    ph-SupplementaryUplink                      PH-UplinkCarrierSCG
OPTIONAL,
    ...
}
PH-UplinkCarrierSCG ::=                     SEQUENCE{
    ph-Type1or3                                 ENUMERATED {type1, type3},
    ...
}
MeasConfig-SN ::=                           SEQUENCE {
    measuredFrequenciesSN                       SEQUENCE (SIZE (1..maxMeasFreqsSN)) OF NR-FreqInfo
OPTIONAL,
    ...
}
NR-FreqInfo ::=                             SEQUENCE {
    measuredFrequency                           ARFCN-ValueNR
OPTIONAL,
    ...
}
ConfigRestrictModReqSCG ::=                 SEQUENCE {
    requestedBC-MRDC                            BandCombinationInfoSN
OPTIONAL,
    requestedP-MaxFR1                           P-Max
OPTIONAL,
    ...,
    [[
    requestedPDCCH-BlindDetectionSCG        INTEGER (1..15)
OPTIONAL,
    requestedP-MaxEUTRA                         P-Max
OPTIONAL
    ]]
}
BandCombinationIndex ::= INTEGER (1..maxBandComb)
BandCombinationInfoSN ::=                   SEQUENCE {
    bandCombinationIndex                        BandCombinationIndex,
    requestedFeatureSets                        FeatureSetEntryIndex
}
FR-InfoList ::= SEQUENCE (SIZE (1..maxNrofServingCells-1)) OF FR-Info
FR-Info ::= SEQUENCE {
    servCellIndex         ServCellIndex,
    fr-Type               ENUMERATED {fr1, fr2}
}
CandidateServing-FreqListEUTRA ::= SEQUENCE (SIZE (1.. maxFreqIDC-MRDC)) OF ARFCN-ValueEUTRA
CandidateServing-FreqListNR ::= SEQUENCE (SIZE (1.. maxFreqIDC-MRDC)) OF ARFCN-ValueNR
-- TAG-CG-CONFIG-STOP
-- ASN1STOP
```

CG-Config field descriptions candidateCellInfoListSN
Contains information regarding cells that the source secondary node suggests the target
secondary gNB to consider configuring.
candidateCellInfoListSN-EUTRA
Includes the MeasResultList3EUTRA as specified in TS 36.331 [10]. Contains information
regarding cells that the source secondary node suggests the target secondary eNB to
consider configuring. This field is only used in NE-DC.
candidateServingFreqListNR, candidateServingFreqListEUTRA
Indicates frequencies of candidate serving cells for In-Device Co-existence Indication (see
TS 36.331 [10]).
configRestrictModReq
Used by SN to request changes to SCG configuration restrictions previously set by MN to
ensure UE capabilities are respected. E.g. can be used to request configuring an NR band
combination whose use MN has previously forbidden.
drx-ConfigSCG
This field contains the complete DRX configuration of the SCG. This field is only used in NR-
DC.
drx-InfoSCG
This field contains the DRX long and short cycle configuration of the SCG. This field is used
in (NG)EN-DC and NE-DC.

fr-InfoListSCG
Contains information of FR information of serving cells that include PScell and Scells configured in SCG.
measuredFrequenciesSN
Used by SN to indicate a list of frequencies measured by the UE.
needForGaps
In NE-DC, indicates wheter the SN requests gNB to configure measurements gaps.
ph-InfoSCG
Power headroom information in SCG that is needed in the reception of PHR MAC CE of MCG
ph-SupplementaryUplink
Power headroom information for supplementary uplink. In the case of (NG)EN-DC and NR-DC, this field is only present when two UL carriers are configued for a serving cell and one UL carrier reports type1 PH while the other reports type 3 PH.
ph-Type1or3
Type of power headroom for a certain serving cell in SCG (PSCell and activated SCells). Value type1 refers to type 1 power headroom, value type3 refers to type 3 power headroom. (See TS 38.321 [3]).
ph-Uplink
Power headroom information for uplink.
pSCellFrequency, pSCellFrequencyEUTRA
Indicates the frequency of PSCell in NR (i.e., pSCellFrequency) or E-UTRA (i.e., pSCellFrequencyEUTRA). In this version of the specification, pSCellFrequency is not used in NE-DC whereas pSCellFrequencyEUTRA is only used in NE-DC.
reportCGI-RequestNR, reportCGI-RequestEUTRA
Used by SN to indicate to MN about configuring reportCGI procedure. The request may optionally contain information about the cell for which SN intends to configure reportCGI procedure. In this version of the specification, the reportCGI-RequestNR is used in (NG)EN-DC and NR-DC whereas reportCGI-RequestEUTRA is used only for NE-DC.
requestedPDCCH-BlindDetectionSCG
Requested value of the reference number of cells for PDCCH blind detection allowed to be configured for the SCG.
requestedP-MaxEUTRA
Requested valume for the maximu power for the serving cells the UE can use in E-UTRA SCG. This field is only used in NE-DC.
requestedP-MaxFR1
Requested value for the maximum power for the serving cells on frequency range 1 (FR1) in this secondary cell group (see TS 38.104 [12]) the UE can use in NR SCG.
requestedBC-MRDC
Used to request configuring an NR band combination and corresponding feature sets which are forbidden to use by MN.
scg-CellGroupConfig
Contains the RRCReconfiguration message:
- to be sent to the UE, used upon SCG establishment or modification, as generated (entirely) by the (target) SgNB. In this case, the SN sets the RRCReconfiguration message in accordance with section 6 e.g. regarding the "Need" or "Cond" statements.
or
- including the current SCG configuration of the UE, when provided in response to a query from MN, or in SN triggered SN change in order to enable delta signaling by the target SN. In this case, the SN sets the RRCReconfiguration message in accordance with section 11.2.3.
The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC.
scg-CellGroupConfigEUTRA
Includes the E-UTRA RRCConnectionReconfiguration message as specified in TS 36.331 [10]. In this version of the specification, the E-UTRA RRC message can only include the field scg-Configuration. Used to (re-)configure the SCG configuration upon SCG establishment or modification, as generated (entirely) by the (target) SeNB. This field is absent when master gNB uses full configuration option. This field is only used in NE-DC.
scg-RB-Config
Contains the IE RadioBearerConfig:
- to be sent to the UE, used to (re-)configure the SCG RB configuration upon SCG establishment or modification, as generated (entirely) by the (target) SgNB or SeNB. In this case, the SN sets the RadioBearerConfig in accordance with section 6, e.g. regarding the "Need" or "Cond" statements.
or
- including the current SCG RB configuration of the UE, when provided in response to a query from MN or in SN triggered SN change in order to enable delta signaling by the target SN. In this case, the SN sets the RRCReconfiguration message in accordance with section 11.2.3.
The field is absent if neither SCG (re)configuration nor SCG configuration query nor SN triggered SN change is performed, e.g. at inter-node capability/configuration coordination which does not result in SCG RB (re)configuration.
selectedBandCombination
Indicates the band combination selected by SN for (NG)EN-DC, NE-DC, and NR-DC.
BandCombinationInfoSN field descriptions

```
bandCombinationIndex
The position of a band combination in the supportedBandCombinationList
requestedFeatureSets
The position in the FeatureSetCombination which identifies one FeatureSetUplink/Downlink
for each band entry in the associated band combination
- CG-ConfigInfo
This message is used by master eNB or gNB to request the SgNB or SeNB to perform certain
actions e.g. to establish, modify or release an SCG. The message may include additional
information e.g. to assist the SgNB or SeNB to set the SCG configuration. It can also be used
by a CU to request a DU to perform certain actions, e.g. to establish, modify or release an
MCG or SCG.
Direction: Master eNB or gNB to secondary gNB or eNB, alternatively CU to DU.
CG-ConfigInfo message
-- ASN1START
-- TAG-CG-CONFIGINFO-START
CG-ConfigInfo ::=                    SEQUENCE {
    criticalExtensions                   CHOICE {
       c1                                   CHOICE{
          cg-ConfigInfo                        CG-ConfigInfo-IEs,
          spare3 NULL, spare2 NULL, spare1 NULL
       },
       criticalExtensions Future            SEQUENCE { }
    }
}
CG-ConfigInfo-IEs ::=       SEQUENCE {
    ue-CapabilityInfo                    OCTET STRING (CONTAINING UE-CapabilityRAT-ContainerList)
OPTIONAL,
                                                                                  == Cond SN-
AddMod
    candidateCellInfoListMN              MeasResultList2NR
OPTIONAL,
    candidateCellInfoListSN              OCTET STRING (CONTAINING MeasResultList2NR)
OPTIONAL,
    measResultCellListSFTD-NR            MeasResultCellListSFTD-NR
OPTIONAL,
    scg-FailureInfo                      SEQUENCE {
       failureType                          ENUMERATED { t310-Expiry, randomAccessProblem,
                                                        rlc-MaxNumRetx, synchReconfig-Failure-SCG,
                                                        scq-reconfig-Failure,
                                                        srb3-IntegrityFailure
       measResultSCG                        OCTET STRING (CONTAINING MeasResultSCG-Failure)
    }
OPTIONAL,
    config-RestrictInfo                  Config-RestrictInfoSCG
OPTIONAL,
    drx-InfoMCG                          DRX-Info
OPTIONAL,
    measConfigMN                         MeasConfigMN
OPTIONAL,
    sourceConfig-SCG                     OCTET STRING (CONTAINING RACReconfiguration)
OPTIONAL,
    scq-RB-Config                        OCTET STRING (CONTAINING RadioBearerConfig)
OPTIONAL,
    mcg-RB-Config                        OCTET STRING (CONTAINING RadioBearerConfig)
OPTIONAL,
    mrdc-AssistanceInfo                  MRDC-AssistanceInfo
OPTIONAL,
    nonCriticalExtension                 CG-ConfigInfo-v1540-IEs
OPTIONAL
}
CG-ConfigInfo-v1540-IEs ::= SEQUENCE {
    ph-InfoMCG                           PH-TypeListMCG
OPTIONAL,
    measResultReportCGI                  SEQUENCE {
       ssbFrequency                         ARFCN-ValueNR,
       cellForWhichToReportCGI              PhysCellId,
       cqi-Info                             CGI-InfoNR
    }
OPTIONAL,
    nonCriticalExtension                 CG-ConfigInfo-v1560-IEs
OPTIONAL
}
CG-ConfigInfo-v1560-IEs ::= SEQUENCE {
    candidateCellInfoListMN-EUTRA        OCTET STRING
OPTIONAL,
    candidateCellInfoListSN-EUTRA        OCTET STRING
OPTIONAL,
    sourceConfig-SCG-EUTRA               OCTET STRING
OPTIONAL,
```

```
scg-FailureInfoEUTRA              SEQUENCE {
    failureTypeEUTRA                  ENUMERATED { t313-Expiry, randomAccessProblem,
                                                  rlc-MaxNumRetx, scq-ChangeFailure},
    measResultSCG-EUTRA               OCTET STRING
}
OPTIONAL,
    drx-Config-MCG                    DRX-Config
OPTIONAL,
    measResultReportCGI-EUTRA         SEQUENCE {
        eutraFrequency                    ARFCN-ValueEUTRA,
        cellForWhichToReportCGI-EUTRA     EUTRA-PhysCellId,
        cqi-InfoEUTRA                     CGI-InfoEUTRA
    }
OPTIONAL,
    measResultCellListSFTD-EUTRA      MeasResultCellListSFTD-EUTRA
OPTIONAL,
    fr-InfoListMCG                    FR-InfoList
OPTIONAL,
    nonCriticalExtension              SEQUENCE { }
OPTIONAL
}
Config-RestrictInfoSCG ::=    SEQUENCE {
    allowedBC-ListMRDC                BandCombinationInfoList
OPTIONAL,
    powerCoordination-FR1             SEQUENCE {
        p-maxNR-FR1                       P-Max
OPTIONAL,
        p-maxEUTRA                        P-Max
OPTIONAL,
        p-maxUE-FR1                       P-Max
OPTIONAL
    }
OPTIONAL,
    servCellIndexRangeSCG             SEQUENCE {
        lowBound                          ServCellIndex,
        upBound                           ServCellIndex
    }
OPTIONAL,
                                                    ==Cond SN-
AddMod
    maxMeasFreqsSCG                   INTEGER(1..maxMeasFreqsMN)
OPTIONAL,
== TBD Late Drop: If maxMeasIdentitiesSCG is used needs to be decided after RAN4 replies to the
LS on measurement requirements for MR-DC.
    maxMeasIdentitiesSCG-NR           INTEGER(1..maxMeasIdentitiesMN)
OPTIONAL,
    ...,
    [[
    maxNumberROHC-ContextSessionsSN   INTEGER(0.. 16384)
OPTIONAL,
    pdcch-BlindDetectionSCG           INTEGER (1..15)
OPTIONAL,
    selectedBandEntriesMN SEQUENCE (SIZE (1..maxSimultaneousBands)) OF BandEntryIndex
OPTIONAL
    ]]
}
BandEntryIndex ::=        INTEGER (0.. maxNrofServing-Cells)
PH-TypeListMCG ::=        SEQUENCE (SIZE (1..maxNrofServing-Cells)) OF PH-InfoMCG
PH-InfoMCG ::=            SEQUENCE {
    servCellIndex                     ServCellIndex,
    ph-Uplink                         PH-UplinkCarrierMCG,
    ph-SupplementaryUplink            PH-UplinkCarrierMCG
OPTIONAL,
    ...
}
PH-UplinkCarrierMCG ::=   SEQUENCE{
    ph-Type1or3                       ENUMERATED {type1, type3},
    ...
}
BandCombinationInfoList ::= SEQUENCE (SIZE (1..maxBandComb)) OF BandCombinationInfo
BandCombinationInfo ::=       SEQUENCE {
    bandCombinationIndex              BandCombinationIndex,
    allowedFeatureSetsList            SEQUENCE (SIZE (1..maxFeatureSetsPerBand)) OF
FeatureSetEntryIndex
}
FeatureSetEntryIndex ::=  INTEGER (1.. maxFeatureSetsPerBand)
DRX-Info ::=                      SEQUENCE {
    drx-LongCycleStartOffset              CHOICE {
        ms10                                  INTEGER(0..9),
```

-continued

```
            ms20                        INTEGER(0..19),
            ms32                        INTEGER(0..31),
            ms40                        INTEGER(0..39),
            ms60                        INTEGER(0..59),
            ms64                        INTEGER(0..63),
            ms70                        INTEGER(0..69),
            ms80                        INTEGER(0..79),
            ms128                       INTEGER(0..127),
            ms160                       INTEGER(0..159),
            ms256                       INTEGER(0..255),
            ms320                       INTEGER(0..319),
            ms512                       INTEGER(0..511),
            ms640                       INTEGER(0..639),
            ms1024                      INTEGER(0..1023),
            ms1280                      INTEGER(0..1279),
            ms2048                      INTEGER(0..2047),
            ms2560                      INTEGER(0..2559),
            ms5120                      INTEGER(0..5119),
            ms10240                     INTEGER(0..10239)
        },
        shortDRX                        SEQUENCE {
            drx-ShortCycle                  ENUMERATED {
                                                ms2, ms3, ms4, ms5, ms6, ms7, ms8, ms10, ms14,
                                                ms16, ms20, ms30, ms32, ms35, ms40, ms64, ms80,
                                                ms128, ms160, ms256, ms320, ms512, ms640,
spare 9,
                                                spare8, spare7, spare6, spare5, spare4, spare3,
                                                spare2, spare1 },
            drx-ShortCycleTimer             INTEGER (1..16)
        } OPTIONAL
}
MeasConfigMN ::= SEQUENCE {
    measuredFrequenciesMN           SEQUENCE (SIZE (1..maxMeasFreqsMN)) OF NR-FreqInfo
OPTIONAL,
    measGapConfig                   SetupRelease { GapConfig }
OPTIONAL,
    gapPurpose                      ENUMERATED {perUE, perFR1}
OPTIONAL,
    ...,
    [[
    measGapConfigFR2                SetupRelease { GapConfig }
OPTIONAL
    ]]
}
MRDC-AssistanceInfo : := SEQUENCE {
    affectedCarrierFreqCombInfoListMRDC     SEQUENCE (SIZE (1..maxNrofCombIDC)) OF
AffectedCarrierFreqCombInfoMRDC,
    ...
}
AffectedCarrierFreqCombInfoMRDC ::= SEQUENCE {
    victimSystemType                VictimSystemType,
    interferenceDirectionMRDC       ENUMERATED {eutra-nr, nr, other, utra-nr-other, nr-
other,
                                                spare3, spare2, spare1},
    affectedCarrierFreqCombMRDC     SEQUENCE   {
        affectedCarrierFreqCombEUTRA    AffectedCarrierFreqCombEUTRA
OPTIONAL,
        affectedCarrierFreqCombNR       AffectedCarrierFreqCombNR
    }   OPTIONAL
}
VictimSystemType ::= SEQUENCE {
    gps                     ENUMERATED {true}       OPTIONAL,
    glonass                 ENUMERATED {true}       OPTIONAL,
    bds                     ENUMERATED {true}       OPTIONAL,
    galileo                 ENUMERATED {true}       OPTIONAL,
    wlan                    ENUMERATED {true}       OPTIONAL,
    bluetooth               ENUMERATED {true}       OPTIONAL
}
AffectedCarrierFreqCombEUTRA ::= SEQUENCE (SIZE (1..maxNrofServingCellsEUTRA)) OF ARFCN-
ValueEUTRA
AffectedCarrierFreqCombNR ::= SEQUENCE (SIZE (1..maxNrofServingCells)) OF ARFCN-ValueNR
-- TAG-CG-CONFIGINFO-STOP
-- ASN1STOP
```

CG-ConfigInfo field descriptions
allowedBC-ListMRDC
A list of indices referring to band combinations in MR-DC capabilities from which SN is
allowed to select the SCG band combination. Each entry refers to a band combination
numbered according to supportedBandCombinationList in the UE-MRDC-Capability (in case -continued of (NG)EN-DC or NE-DC) or UE-NR-Capability (in case of NR-DC) and the Feature Sets
allowed for each band entry. All MR-DC band combinations indicated by this field comprise
the MCG band combination, which is a superset of the MCG band(s) selected by MN.
candidateCellInfoListMN, candidateCellInfoListSN
Contains information regarding cells that the master node or the source node suggests the
target gNB to consider configuring.
For (NG)EN-DC, including CSI-RS measurement results in candidateCellInfoUstMN is not
supported in this version of the specification. For NR-DC, including SSB and/or CSI-RS
measurement results in candidateCellInfoUstMN is supported.
candidateCellInfoListMN-EUTRA, candidateCellInfoListSN-EUTRA
Includes the MeasResultList3EUTRA as specified in TS 36.331 [10]. Contains information
regarding cells that the master node or the source node suggests the target secondary eNB
to consider configuring. These fields are only used in NE-DC.
configRestrictInfo
Includes fields for which SgNB is explictly indicated to observe a configuration restriction.
drx-ConfigMCG
This field contains the complete DRX configuration of the MCG. This field is only used in NR-
DC.
drx-InfoMCG
This field contains the DRX long and short cycle configuration of the MCG. This field is used
in (NG)EN-DC and NE-DC.
fr-InfoListMCG
Contains information of FR information of serving cells that include PCell and SCell(s)
configured in MCG.
maxMeasFreqsSCG
Indicates the maximum number of NR inter-frequency carriers the SN is allowed to
configure with PSCell for measurements.
maxMeasIdentitiesSCG-NR
Indicates the maximum number of allowed measurement identities that the SCG is allowed
to configure.
maxNumberROHC-ContextSessionsSN
Indicates the maximum number of context sessions allowed to SN terminated bearer,
excluding context sessions that leave all headers uncompressed.
measuredFrequenciesMN
Used by MN to indicate a list of frequencies measured by the UE.
measGapConfig
Indicates the FR1 and perUE measurement gap configuration configured by MN.
measGapConfigFR2
Indicates the FR2 measurement gap configuration configured by MN.
measResultCellListSFTD
Indicates the SFTD measurements between the PCell and the NR PSCell.
measResultReportCGI, measResultReportCGI-EUTRA
Used by MN to provide SN with CGI-Info for the cell as per SN's request. In this version of
the specification, the measResultReportCGI is used for (NG)EN-DC and NR-DC and the
measResultReportCGI-EUTRA is used only for NE-DC.
measResultSCG-EUTRA
This field includes the MeasResultSCG-FailureMRDC IE as specified in TS 36.331 [10]. This
field is only used in NE-DC.
measResultSFTD-EUTRA
SFTD measurement results between the PCell and the E-UTRA PScell in NE-DC. This field is
only used in NE-DC.
mcg-RB-Config
Contains all of the fields in the IE RadioBearerConfig used in MCG, used by the SN to
support delta configuration to UE, for bearer type change between MN terminated bearer
with NR PDCP to SN terminated bearer. It is also used to indicate the PDCP duplication
related information for MN terminated split bearer (whether duplication is configured and
if so, whether it is initially activated) in SN Addition/Modification procedure. Otherwise,
this field is absent.
mrdc-AssistanceInfo
Contains the IDC assistance information for MR-DC reported by the UE (see TS 36.331 [10]).
pdcch-BlindDetectionSCG
Indicates the maximum value of the reference number of cells for PDCCH blind detection
allowed to be configured for the SCG.
p-maxEUTRA
Indicates the maximum total transmit power to be used by the UE in the E-UTRA cell group
(see TS 36.104 [33]). This field is used in (NG)EN-DC and NE-DC.
p-maxNR-FR1
Indicates the maximum total transmit power to be used by the UE in the NR cell group
across all serving cells in frequency range 1 (FR1) (see TS 38.104 [12]) the UE can use in NR
SCG.
p-maxUE-FR1
Indicates the maximum total transmit power to be used by the UE across all serving cells in
frequency range 1 (FR1).
ph-InfoMCG
Power headroom information in MCG that is needed in the reception of PHR MAC CE in
SCG.
ph-SupplementaryUplink
Power headroom information for supplementary uplink. For UE in (NG)EN-DC, this field is
absent.

-continued ph-Type1or3
Type of power headroom for a serving cell in MCG (PCell and activated SCells). type1 refers
to type 1 power headroom, type3 refers to type 3 power headroom. (See TS 38.321 [3]).
ph-Uplink
Power headroom information for uplink.
powerCoordination-FR1
Indicates the maximum power that the UE can use in FR1.
scgFailureInfo
Contains SCG failure type and measurement results. In case the sender has no
measurement results available, the sender may include one empty entry (i.e. without any
optional fields present) in measResultsPerMOList. This field is used in (NG)EN-DC and NR-
DC.
scgFailureInfoEUTRA
Contains SCG failure type and measurement results of the EUTRA secondary cell group.
This field is only used in NE-DC.
scg-RB-Config
Contains all of the fields in the IE RadioBearerConfig used in SCG, used to allow the target
SN to use delta configuration to the UE, e.g. during SN change. The field is signalled upon
change of SN. Otherwise, the field is absent. This field is also absent when master eNB uses
full configuration option.
selectedBandEntiesMN
Indicates the position of a band entry selected by the MN, in the first band combination
entry in allowedBC-ListMRDC IE. Each band entry in the subset is identified by its position
in the bandlist of this BandCombinaiton. The SN uses this information to determine which
bands out of the NR band combinations in allowedBC-UstMRDC it can configure in SCG.
This field is only used in NR-DC.
servCellIndexRangeSCG
Range of serving cell indices that SN is allowed to configure for SCG serving cells.
sourceConfigSCG
Includes all of the current SCG configurations used by the target SN to build delta
configuration to be sent to UE, e.g. during SN change. The field contains the
RRCReconfiguration message, i.e. including CellGroupConfig and measConfig. The field is
signalled upon change of SN, unless MN uses full configuration option. Otherwise, the field
is absent.
sourceConfigSCG-EUTRA
Includes the E-UTRA RRCConnectionReconfiguration message as specified in TS 36.331 [10].
In this version of the specification, the E-UTRA RRC message can only include the field scg-
Configuration. In this version of the specification, this field is absent when master gNB uses
full configuration option. This field is only used in NE-DC.
ue-CapabilityInfo
Contains the IE UE-CapabilityRAT-ContainerList supported by the UE (see NOTE 3). The field
is signalled upon addition, modification or change of SN.
BandCombinationInfo field descriptions
allowedFeatureSetsList
Defines a subset of the entries in a FeatureSetCombination. Each index identifies a position
in the FeatureSetCombination, which corresponds to one FeatureSetUplink/Downlink for
each band entry in the associated band combination.
bandCombinationIndex
The position of a band combination in the supportedBandCombinationList

| Conditional Presence | Explanation |
| --- | --- |
| SN-AddMod | The field is mandatory present upon SN addition and SN change. It is optionally present upon SN modification. Otherwise, the field is absent. |

NOTE 3: The following table indicates per source RAT whether RAT capabilities
are included or not in ue-CapabilityInfo.

| Source RAT | NR capabilities | E-UTRA capabilities | MR-DC capabilities |
| --- | --- | --- | --- |
| E-UTRA | Included | Not included | Included |

Vehicle-to-Everything (V2X)

FIG. 5 illustrates a Cellular Intelligent Transport Systems (ITS) (C-ITS) environment. C-ITS aims at defining a new cellular ecosystem for the delivery of vehicular services and their dissemination. Such ecosystem includes both short range and long range V2X service transmissions. In particular, short range communication involves transmissions over a Device-to-Device (D2D) link, also defined as a Sidelink (SL) or PC5 interface in 3GPP, towards other vehicular UEs or Road Side Units (RSUs). On the other hand, for long range transmission, it considers the transmission over the Uu interface between a UE and a base station, in which case packets may be disseminated to different ITS service providers, which could be road traffic authorities, road operators, automotive Original Equipment Manufacturers (OEMs), cellular operators, etc.

When it comes to the SL interface, the first standardization effort in 3GPP dates back to Release (Rel) 12, targeting public safety use cases. Since then, a number of enhancements have been introduced with the objective to enlarge the use cases that could benefit from the D2D technology. Particularly, in LTE Rel-14 and Rel-15, the extensions for the D2D work consists of supporting V2X communication, including any combination of direct communication between vehicles (Vehicle-to-Vehicle (V2V)), pedestrians (Vehicle-to-Pedestrian (V2P)), and infrastructure (Vehicle-to-Infrastructure (V2I)).

While LTE V2X mainly aims at traffic safety services, NR V2X has a much broader scope including not only basic safety services, but also targeting non-safety applications such as extended sensor/data sharing between vehicles, with the objective to strengthen the perception of the surrounding environment of vehicles. Hence, a new set of applications have been captured in 3GPP Technical Report (TR) 22.886 V16.2.0 that would require an enhanced NR system and new NR SL framework. These applications include advanced driving, vehicles platooning, cooperative maneuvers between vehicles, and remote driving.

In this new context, the expected requirements to meet the needed data rate, capacity, reliability, latency, communication range, and speed are made more stringent. What is more, both communication interfaces, PC5 and Uu, could be used to support the advanced V2X use cases, taking into account radio conditions and the environment where the enhanced V2X (eV2X) scenario takes place. For example, given the variety of services that can be transmitted over the SL, a robust Quality of Service (QoS) framework which takes into account the different performance requirements of the different V2X services seems to be needed. Additionally, NR protocols to handle more robust and reliable communication should be designed. All of these issues are currently under the investigation of 3GPP in NR Rel-16.

Radio Link Failure (RLF) Due to Physical Layer Problems

FIG. 6 illustrates RLF due to physical layer problems. It may occur that a UE loses coverage to the cell that the UE is currently connected to. This could occur in a situation when a UE enters a fading dip, or that a handover was needed as described above, but the handover failed for one or another reason. This is particularly true if the "handover region" is very short, as will be further described below.

The quality of the radio link is typically monitored in the UE, e.g. on the physical layer, as described in 3GPP TS 38.300 V15.6.0, TS 38.331 V15.6.0 and TS 38.133 V15.6.0, and summarized here in a very short description.

Upon detection that the physical layer experiences problems according to criteria defined in TS 38.133, the physical layer sends an indication to the RRC protocol of the detected problems (out-of-sync indication). After a configurable number (N310) of such consecutive indications, a timer (T310) is started. If the link quality is not improved (recovered) while T310 is running (i.e., there are no N311 consecutive "in-sync" indications from the physical layer), an RLF is declared in the UE, see FIG. 6.

The relevant timers and counters described above are listed here for reference. The UE reads the timer-values from system information broadcasted in the cell. Alternatively, it is possible to configure the UE with UE-specific values of the timers and constants using dedicated signaling, i.e. where specific values are given to specific UEs with messages directed only to each specific UE.

| Timer | Start | Stop | At expiry |
|---|---|---|---|
| T310 | Upon detecting physical layer problems for the SpCell i.e. upon receiving N310 | Upon receiving N311 consecutive in-sync indications from lower layers for the SpCell, upon receiving | If the T310 is kept in MCG: If AS security is not activated: go to RRC_IDLE else: initiate the |
| | consecutive out-of-sync indications from lower layers. | RRCReconfiguration with reconfigurationWithSync for that cell group, and upon initiating the connection re-establishment procedure. Upon SCG release, if the T310 is kept in SCG. | connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |

Now, if T310 expires for MCG, and as seen above, the UE initiates a connection re-establishment to recover the ongoing RRC connection. This procedure now includes cell selection by the UE. I.e., the RRC_CONNECTED UE shall now try to autonomously find a better cell to connect to, since the connection to the previous cell failed according to the described measurements (it could occur that the UE returns to the first cell anyway, but the same procedure is also then executed). Once a suitable cell is selected (as further described, e.g., in TS 38.304), the UE requests to re-establish the connection in the selected cell. It is important to note the difference in mobility behaviour as an RLF results in UE based cell selection, in contrast to the normally applied network-controlled mobility.

If the re-establishment is successful (which depends, among other things, on if the selected cell and the gNB controlling that cell was prepared to maintain the connection to the UE), then the connection between the UE and the gNB can resume.

A failure of a re-establishment means that the UE goes to RRC_IDLE and the connection is released. To continue communication, a brand new RRC connection has then to be requested and established.

The reason for introducing the timers T31x and counters N31x described above is to add some freedom and hysteresis for configuring the criteria for when a radio link should be considered as failed (and recovered). This is desirable, since it would hurt the end-user performance if a connection is abandoned prematurely if it turned out that the loss of link quality was temporary, and the UE succeeded in recovering the connection without any further actions or procedures (e.g., before T310 expires, or before the counting reaches value N310).

The procedures for NR RLF detection related actions are shown below (text reproduced from 3GPP TS 38.331 V15.6.0):

5.3.10 Radio link failure related actions
5.3.10.1 Detection of physical layer problems in RRC_CONNECTED
The UE shall:
   1>upon receiving N310 consecutive "out-of-sync" indications for the SpCell from lower
     layers while neither T300, T301, T304, T319 not T311 is running:
     2>start timer T310 for the corresponding SpCell.
5.3.10.2 Recovery of physical layer problems
Upon receiving N311 consecutive "in-sync" indications for the SpCell from lower layers while
T310 is running, the UE shall:
   1>stop timer T310 for the corresponding SpCell.
   NOTE 1: In this case, the UE maintains the RRC connection without explicit signalling,
       i.e. the UE maintains the entire radio resource configuration.
   NOTE 2: Periods in time where neither "in-sync" nor "out-of-sync" is reported by layer 1
       do not affect the evaluation of the number of consecutive "in-sync" or "out-of-
       sync" indications.
5.3.10.3 Detection of radio link failure
The UE shall:
   1>upon T310 expiry in PCell; or
   1>upon random access problem indication from MCG MAC while neither T300, T301,
     T304 nor T311 is running; or
   1>upon indication from MCG RLC that the maximum number of retransmissions has been
     reached:
     2>if CA duplication is configured and activated; and for the corresponding logical
       channel allowedServingCells only includes SCell(s):
       3>initiate the failure information procedure as specified in 5.7.x to report RLC
         failure.
     2>else:
       3>consider radio link failure to be detected for the MCG i.e. RLF;
       3>if AS security has not been activated:
         4>perform the actions upon going to RRC_IDLE as specified in 5.3.11, with
           release cause 'other';
       3>else:
         4>initiate the connection re-establishment procedure as specified in 5.3.7.
The UE shall:
   1>upon T310 expiry in PSCell; or
   1>upon random access problem indication from SCG MAC; or
   1>upon indication from SCG RLC that the maximum number of retransmissions has been
     reached:
     2>if CA duplication is configured and activated; and for the corresponding logical
       channel allowedServingCells only includes SCell(s):
       3>initiate the failure information procedure as specified in 5.7.x to report RLC
         failure.
     2>else:
       3>consider radio link failure to be detected for the SCG i.e. SCG-RLF;
     2>initiate the SCG failure information procedure as specified in 5.7.3 to report SCG
       radio link failure.

NR SL Unicast Link

FIG. 7 illustrates NR SL unicast links between a pair of UEs. For NR SL, unicast at access stratum is supported for services requiring high reliability. Between the same UE pair, there can be multiple SL unicast links and each link can support multiple SL QoS flows/radio bearers. At access stratum each link can be identified by the source and destination L2 Identity (ID). For instance, the PC5 unicast link 1 in FIG. 7 can be identified by the pair of L2 ID1 (i.e., corresponding to application ID1) and L2 ID2 (i.e., corresponding to application ID2).

More specifically, at physical layer, Hybrid Automatic Repeat Request (HARQ) Acknowledgement/Negative Acknowledgement (ACK/NACK) feedback can be configured such that the receiver UE in a SL unicast pair will send ACK when the Transport Block (TB) is received successfully or send NACK when the TB reception fails. Besides RLC Unacknowledged Mode (UM), RLC Acknowledged Mode (AM) can also be configured for NR SL unicast transmission/reception. When RLC AM is configured, depending on RLC Protocol Data Unit (PDU) reception failure, the receiving (RX) UE will send an RLC status report to the transmitting (TX) UE and request retransmitting the missing RLC PDUs.

A similar RLF procedure as in NR Uu is also supported for NR SL unicast with following possible criteria:
   Expiry of a timer started after indication of radio problems (e.g., Out of Sync) from the physical layer; or
   Maximum number of RLC retransmissions is reached; or
   Maximum number of consecutive HARQ NACK feedbacks is reached; or
   Channel Busy Ratio (CBR) is higher than a threshold value.

FIG. 8 illustrates a link release procedure for the NR SL unicast links of FIG. 7. At the end, one UE may release an established unicast link due to bad link quality or due to stopped service. The illustrated link release procedure is based on PC5-S signaling.

SL Resource Allocation

There are two different Resource Allocation (RA) procedures for V2X on SL, i.e. network controlled RA (so called "mode 3" in LTE and "mode 1" in NR) and autonomous RA (so called "mode 4" in LTE and "mode 2" in NR). The transmission resources are selected within a resource pool which is predefined or configured by the network.

With network controlled RA, NG-RAN is in charge of scheduling SL resource(s) to be used by the UE for SL transmission(s). The UE sends SL Buffer Status Report (BSR) to the network to inform about SL data available for transmission in the SL buffers associated with the Medium Access Control (MAC) entity. The network then signals the RA to the UE using Downlink Control Information (DCI). Network controlled (or mode 1) RA may be realized via dynamic scheduling signalling via Physical Downlink Control Channel (PDCCH), or by semi-persistent scheduling in which the gNB provides one or more configured SL grants. Both type-1 and type-2 configured SL grants are supported.

With autonomous RA, each device independently decides which SL radio resources to use for SL operations, based on, e.g., reading received SL Control Information (SCI) or energy detection. For both RA modes, an SCI is transmitted on Physical Sidelink Control Channel (PSCCH) to indicate the assigned SL resources for Physical Sidelink Shared Channel (PSSCH). Unlike network controlled RA, which can only be performed when the UE is in RRC_CONNECTED state, autonomous RA (or mode 2) can be performed both when the UE is in RRC_CONNECTED mode and when the UE is in INACTIVE/IDLE state, and also when the UE is under Uu coverage and out-of-coverage. In particular, when the UE is in RRC_CONNECTED mode, the SL resource pool can be configured with dedicated RRC signalling, while for IDLE/INACTIVE mode operations, the UE shall rely on the SL resource pool provisioned in broadcasting signal, i.e. System Information Block (SIB).

There currently exist certain challenge(s). Compared to NR Uu where, for MR-DC scenarios, the RLF detection is handled with many different RRC procedures, when considering NR SL, there is no defined RRC procedure to handle the cases when an RLF is experienced. This of course means that, in case of SL RLF, the connectivity is released and no attempts to recover it (or re-establish) are performed.

SUMMARY

SL Radio Link Failure (RLF) handling in Multi-Radio Dual Connectivity (MR-DC) scenarios is provided. In some embodiments, a method is performed by a first wireless device for detecting and handling a sidelink RLF in a cellular communications system, the method comprising: detecting a sidelink RLF for a sidelink between the first wireless device and a second wireless device; and sending a sidelink RLF indication to a radio access node in a radio access network of the cellular communications system.

In some embodiments, the method further comprises: starting a timer upon detecting the sidelink RLF; and determining that the timer has expired without the sidelink being restored; wherein sending the sidelink RLF indication to the radio access node comprises sending the sidelink RLF indication to the radio access node upon determining that the timer has expired without the sidelink being restored.

In some embodiments, the method further comprises performing a setup or resume procedure to setup or resume a connection with the radio access node.

In some embodiments, the method further comprises releasing the sidelink.

In some embodiments, the method further comprises notifying the radio access node that that the sidelink has been released.

In some embodiments, the method further comprises sending a notification to the second wireless device that the first wireless device has sent the sidelink RLF indication to the radio access node.

In some embodiments, sending the sidelink RLF indication to the radio access node comprises sending a Radio Resource Control (RRC) message comprising the sidelink RLF indication to the radio access node. In some embodiments, the RRC message comprises FailureInformation, SCGFailureInformation, or MCGFailureInformation, and the sidelink RLF indication is comprised in the FailureInformation, SCGFailureInformation, or MCGFailureInformation. In some embodiments, the RRC message is a RRC message used only for sidelink related procedures.

In some embodiments, the sidelink RLF indication comprises any one or more of the following information: one or more identifiers associated with the sidelink; information that indicates a reason of the sidelink RLF; one or more identifiers of one or more services running on the sidelink at the time of the sidelink RLF; one or more authorized or interested frequencies to operate sidelink services for the sidelink; or one or more measurements related to the sidelink. In some embodiments, the information that indicates the reason of the sidelink RLF comprises a failureType among the following: Out of Sync, reached maximum number of Radio Link Control (RLC) retransmissions, reached maximum number of consecutive Hybrid Automatic Repeat Request (HARQ) Negative Acknowledgement (NACK) feedbacks, high Channel Busy Ratio (CBR), or reconfiguration error.

In some embodiments, the method further comprises: receiving a response from the radio access node that triggers one or more actions; and performing the one or more actions. In some embodiments, the method further comprises: receiving a response from another radio access node that triggers one or more actions related to handling the sidelink RLF; and performing the one or more actions. In some embodiments, performing the one or more actions comprises performing one or more of the following: applying a sidelink Radio Bearer (SLRB) configuration; applying a Quality of Service (QoS) mapping rule; using a new resource pool; or using a new transmission mode.

In some embodiments, the radio access node is a primary node of the first wireless device.

In some embodiments, the radio access node is a secondary node of the first wireless device.

In some embodiments, a User Equipment (UE) comprises a processor configured to perform the method of any of the above embodiments.

In some embodiments, a method is performed by a base station for handling a sidelink RLF of a sidelink between a first wireless device and a second wireless device, the method comprising: receiving a sidelink RLF indication from a first wireless device, the sidelink RLF indication being an indication of a sidelink RLF for a sidelink between the first wireless device and the second wireless device; and sending a response to handle the sidelink RLF.

In some embodiments, sending the response to handle the sidelink RLF comprises sending a response to the first wireless device that triggers one or more actions for handling the sidelink RLF. In some embodiments, sending the response to handle the sidelink RLF comprises: sending the sidelink RLF indication to another network node; receiving a response from the other network node; and sending the response to the first wireless device, the response being a response that triggers one or more actions for handling the sidelink RLF. In some embodiments, the one or more actions for handling the sidelink RLF comprises one or more of the following: applying a SLRB configuration; applying a QoS mapping rule; using a new resource pool; or using a new transmission mode.

In some embodiments, sending the response to handle the sidelink RLF comprises sending the sidelink RLF indication to another network node.

In some embodiments, the method further comprises receiving, from the first wireless device, a notification that the first wireless device has released the sidelink.

In some embodiments, receiving the sidelink RLF indication comprises receiving a RRC message comprising the sidelink RLF indication. In some embodiments, the RRC message comprises Fail ureInformation, SCGFailureInformation, or MCGFailureInformation, and the sidelink RLF indication is comprised in the FailureInformation, SCGFailureInformation, or MCGFailureInformation. In some embodiments, the RRC message is an RRC message used only for sidelink related procedures.

In some embodiments, the sidelink RLF indication comprises any one or more of the following information: one or more identifiers associated with the sidelink; information that indicates a reason of the sidelink RLF; one or more identifiers of one or more services running on the sidelink at the time of the sidelink RLF; one or more authorized or interested frequencies to operate sidelink services for the sidelink; or one or more measurements related to the sidelink. In some embodiments, the information that indicates the reason of the sidelink RLF comprises a failureType among the following: Out of Sync, reached maximum number of RLC retransmissions, reached maximum number of consecutive HARQ NACK feedbacks, high CBR, or reconfiguration error.

In some embodiments, the base station is a primary node of the first wireless device.

In some embodiments, the base station is a secondary node of the first wireless device.

In some embodiments, a method is performed by a base station for handling a sidelink Radio Link Failure, RLF, of a sidelink between a first wireless device and a second wireless device, the method comprising: receiving a sidelink RLF indication from a network node, the sidelink RLF indication being an indication of an sidelink RLF for a sidelink between the first wireless device and the second wireless device; and sending a response that triggers one or more actions for handling the sidelink RLF.

In some embodiments, sending the response comprises sending the response to the network node.

In some embodiments, sending the response comprises sending the response to the first wireless device.

In some embodiments, a radio access node comprises a processor configured to perform the method of any of the above embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
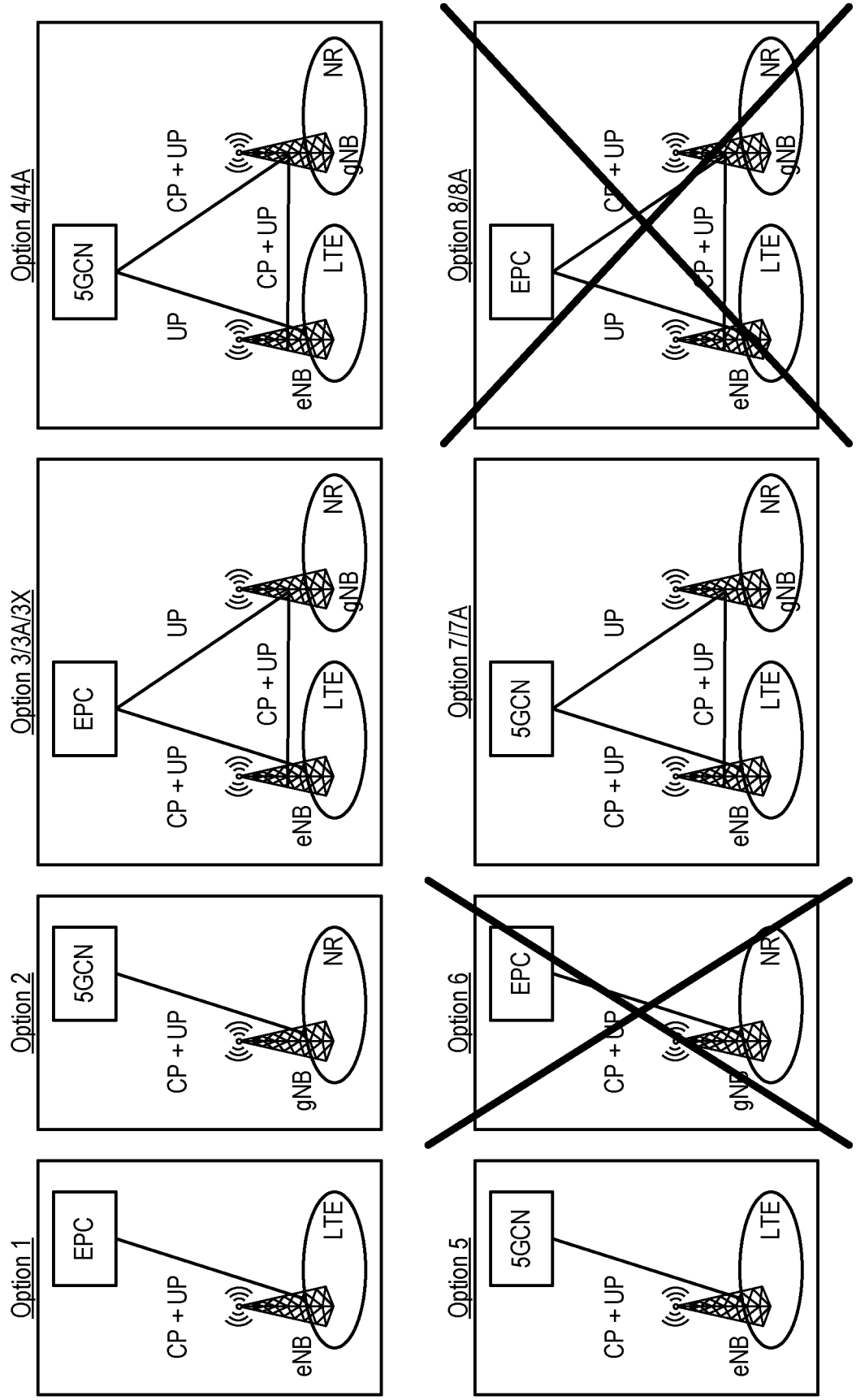
FIG. 1 illustrates different ways to deploy a Fifth Generation (5G) New Radio (NR) network with or without interworking with Long Term Evolution (LTE) radio access (also referred to as Evolved Universal Terrestrial Radio Access (E-UTRA)) and an Evolved Packet Core (EPC).
Figure 2:
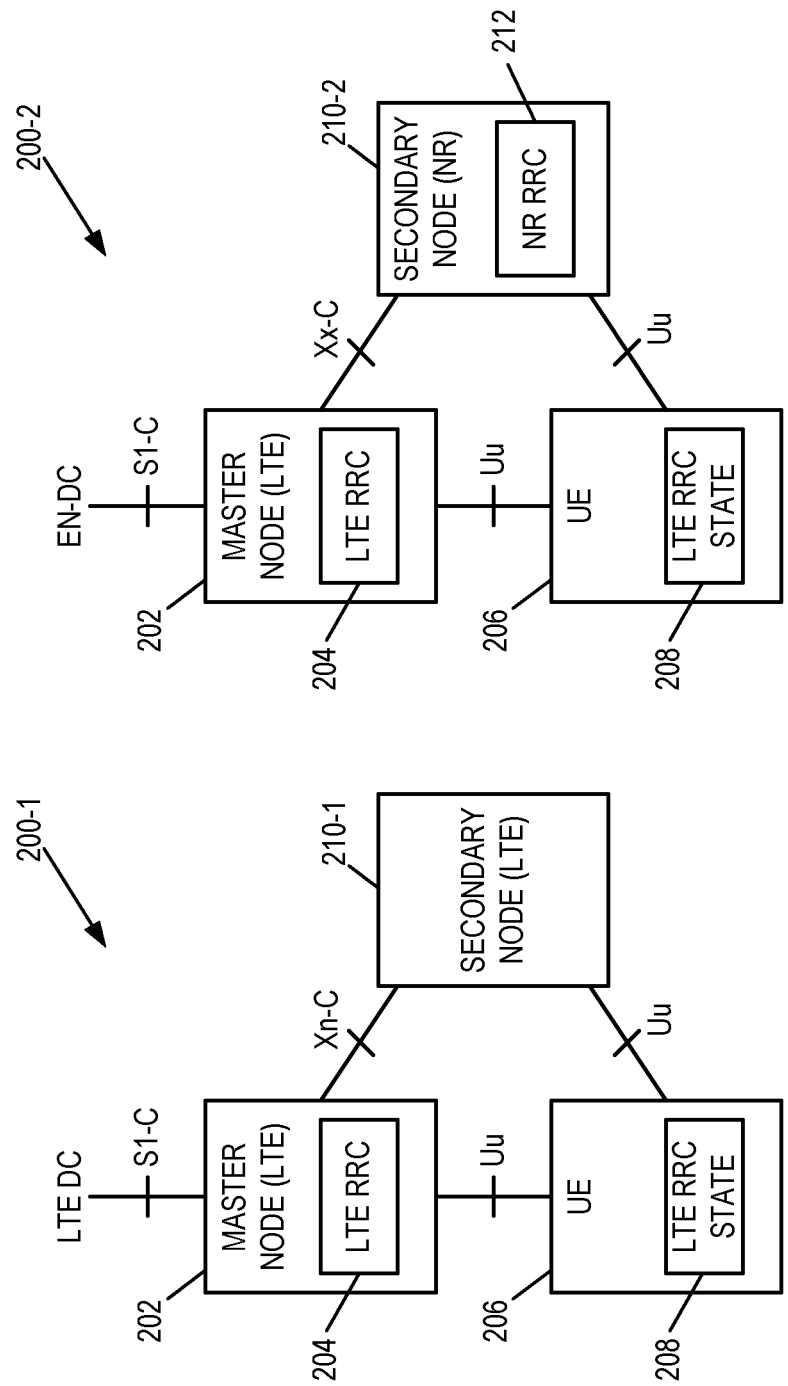
FIG. 2 shows a schematic control plane architecture for Dual Connectivity (DC) in LTE DC and a control plane architecture for Evolved Universal Terrestrial Radio Access Network (E-UTRAN) NR DC (EN-DC).
Figure 3:
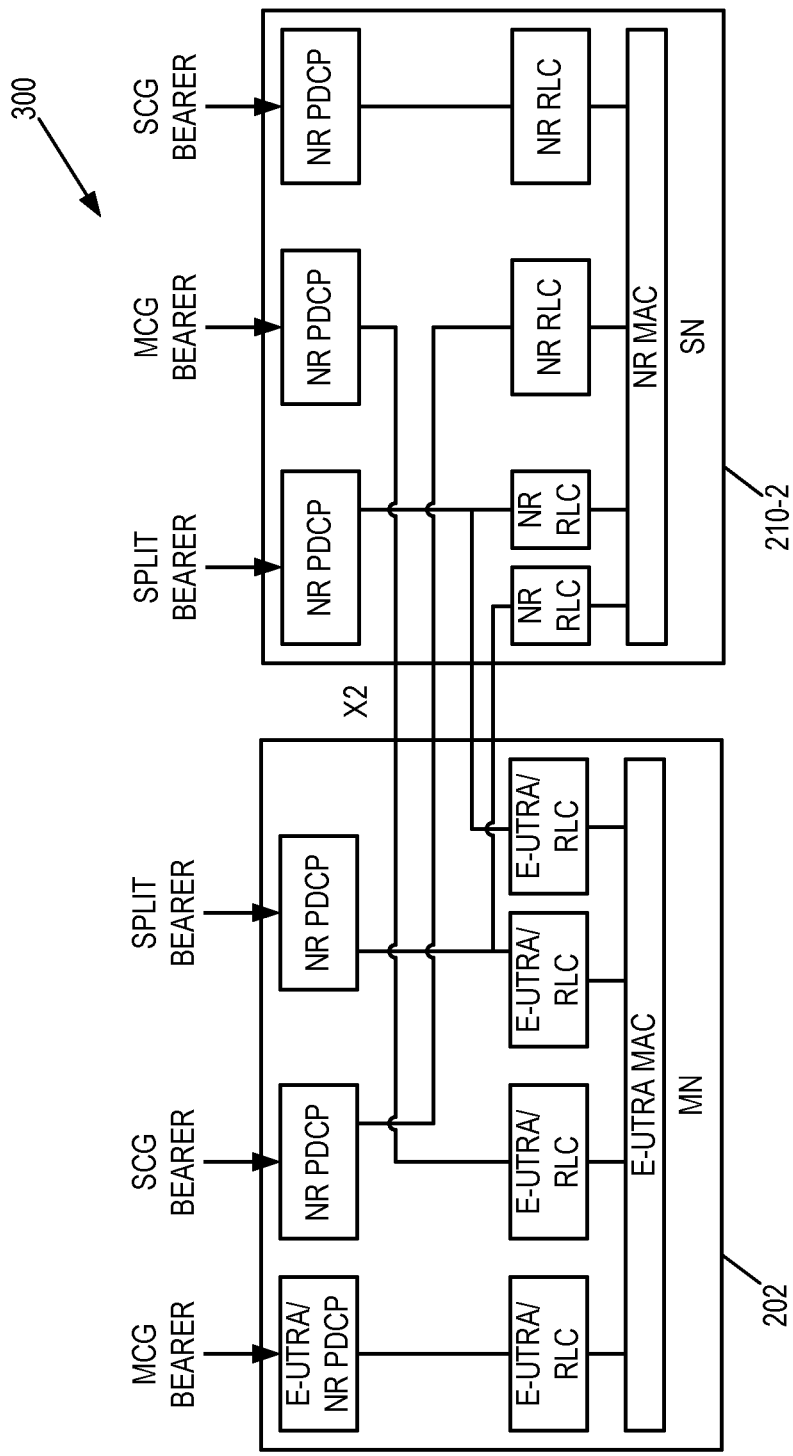
FIG. 3 illustrates network side protocol termination options for Master Cell Group (MCG), Secondary Cell Group (SCG), and split bearers in Multi-Radio DC (MR-DC) with EPC (EN-DC).
Figure 4:
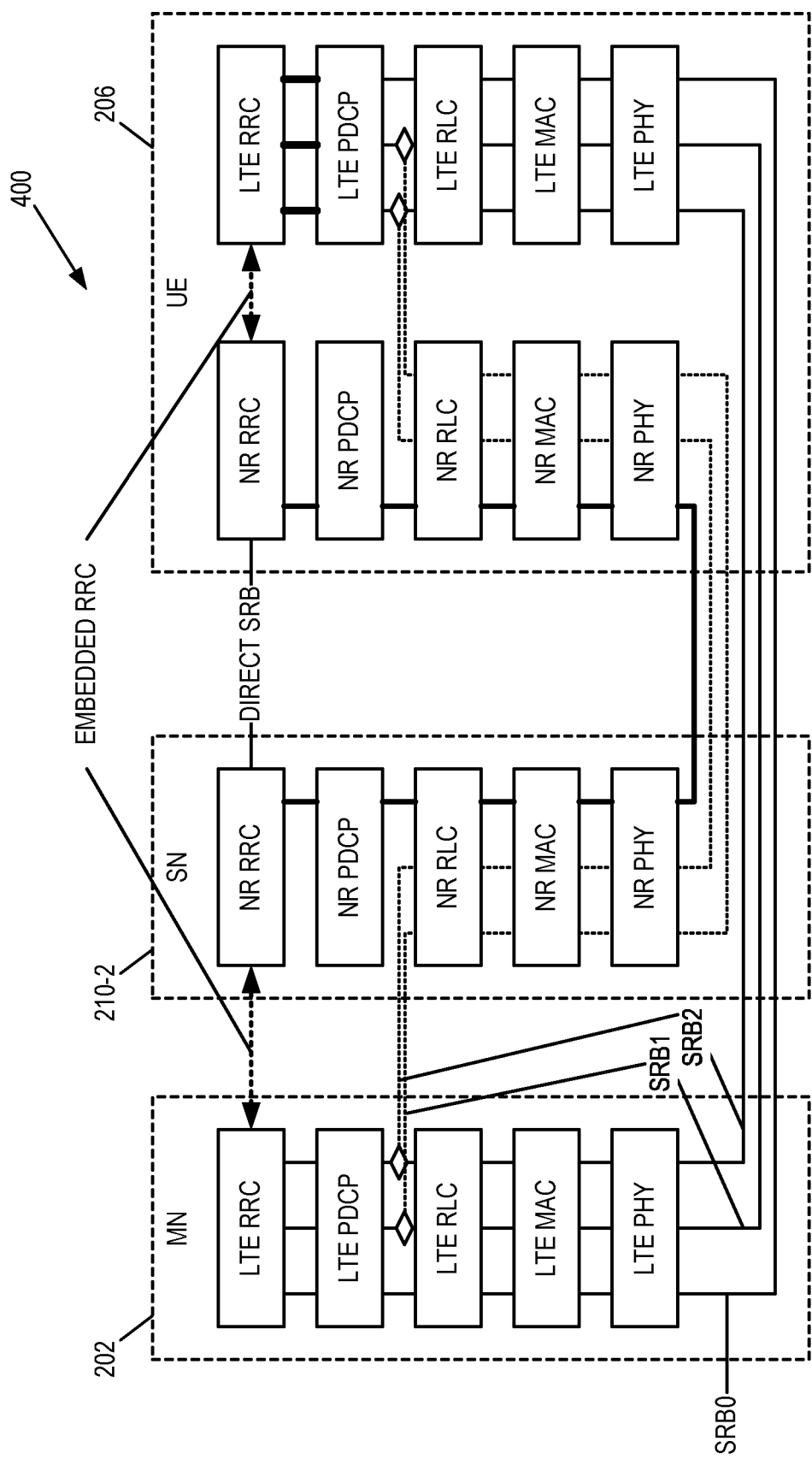
FIG. 4 illustrates a network architecture for Control Plane (CP) in EN-DC.
Figure 5:
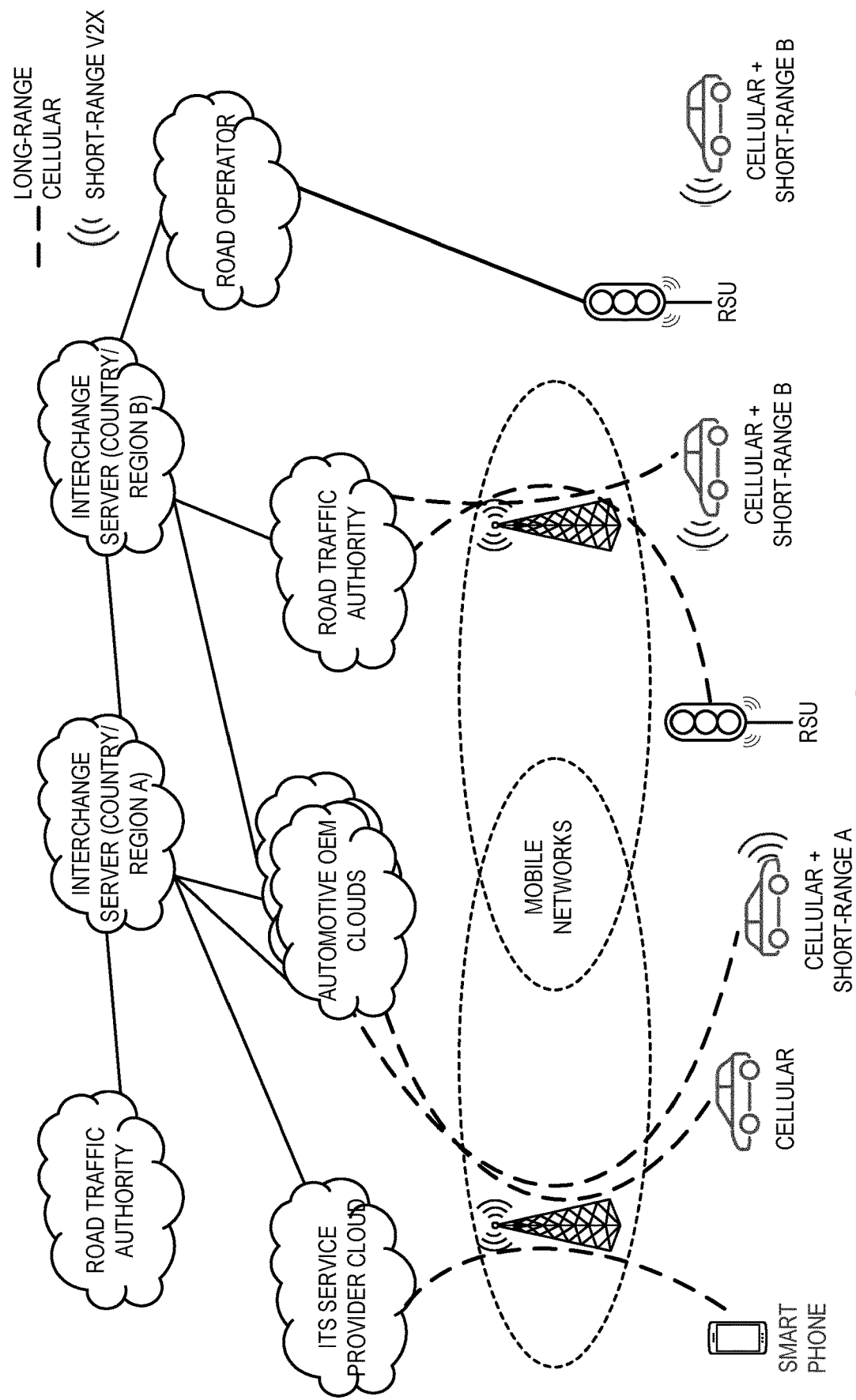
FIG. 5 illustrates a Cellular Intelligent Transport Systems (ITS) (C-ITS) environment.
Figure 6:
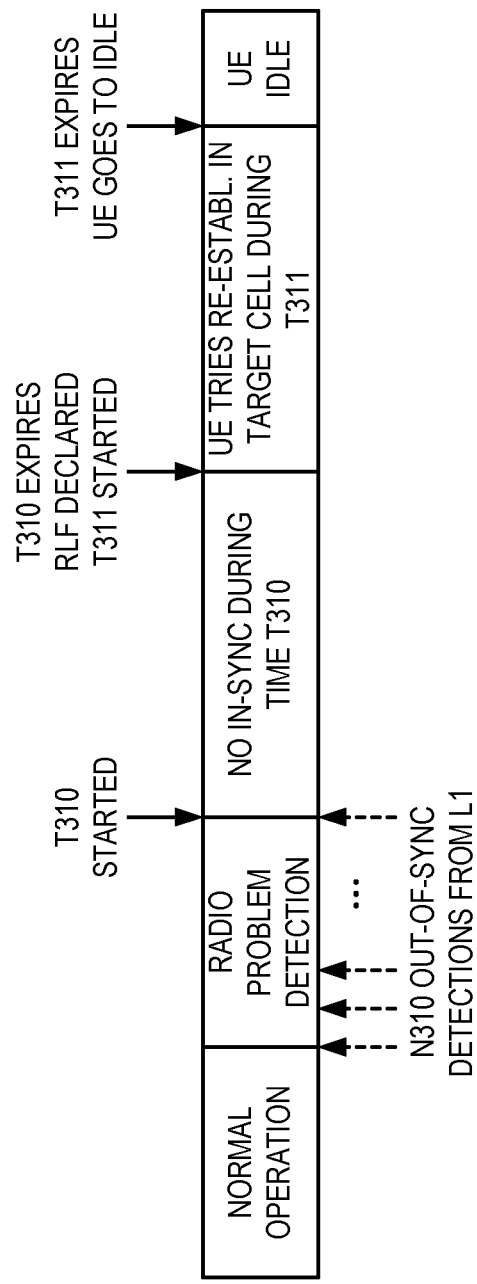
FIG. 6 illustrates Radio Link Failure (RLF) due to physical layer problems.
Figure 7:
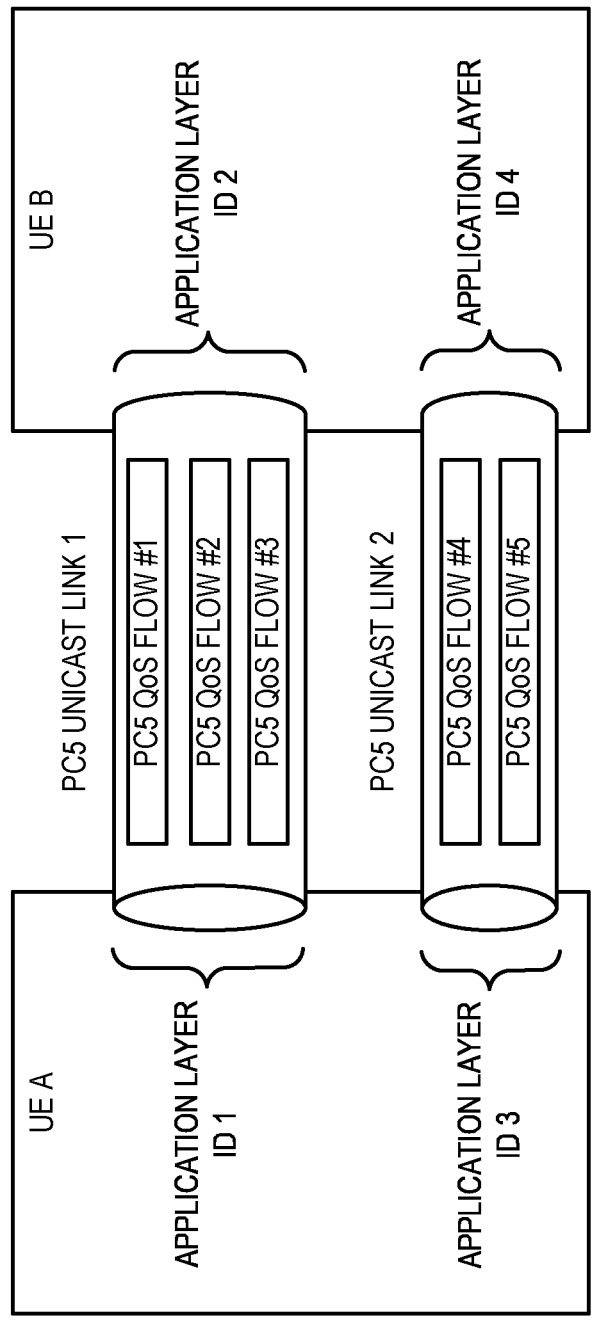
FIG. 7 illustrates NR Sidelink (SL) unicast links between a pair of User Equipment (UEs).
Figure 8:
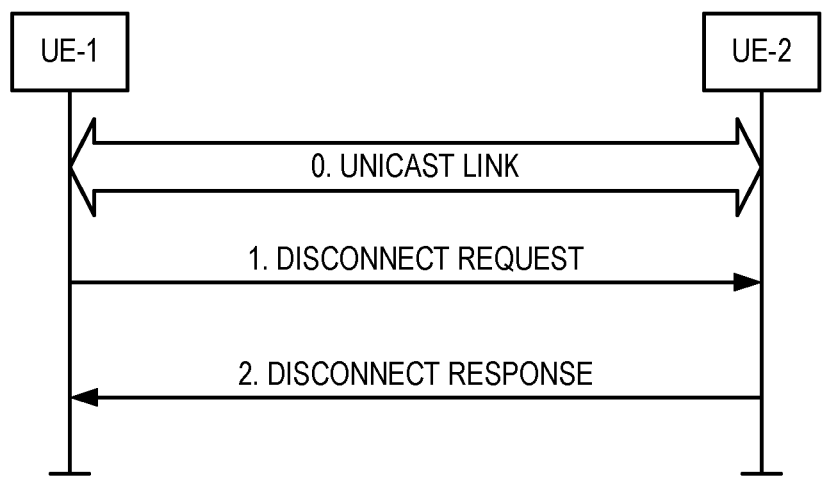
FIG. 8 illustrates a link release procedure for the NR SL unicast links of FIG. 7.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN) or any node that implements a CN function. Some examples of a CN node include, e.g., a Mobility Management Entity (MME), a Packet Data Network Gateway (P-GW), a Service Capability Exposure Function (SCEF), a Home Subscriber Server (HSS), or the like. Some other examples of a CN node include a node implementing a Access and Mobility Function (AMF), a User Plane (UP) Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Sidelink Wireless Device: As used herein, a "sidelink wireless device," "sidelink capable wireless device," "sidelink UE," or "sidelink capable UE" is a wireless device or UE capable of Sidelink (SL) communication.

Network Node: As used herein, a "network node" is any node that is either part of the RAN or the CN of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

SL Radio Link Failure (RLF) handling in Multi-Radio Dual Connectivity (MR-DC) scenarios is provided. Compared to NR Uu where, for MR-DC scenarios, the RLF detection is handled with many different Radio Resource Control (RRC) procedures, when considering NR SL, there is no defined RRC procedure to handle the cases when an RLF is experienced. This of course means that, in case of SL RLF, the connectivity is released and no attempts to recover it (or re-establish) are performed. This is not ideal since the presence of (at least) two different network nodes (i.e., the MN and SN) may enable SL recovery mechanism, thus guaranteeing no SL connectivity interruption and an unnecessary SL time-consuming RRC procedure.

Systems and methods are disclosed herein for handling SL RLF detection and declaration for an SL unicast link in MR-DC scenarios. In some embodiments, when an RLF is detected on one of the SL UEs, a message is sent to the primary or secondary node to notify the network about the failure. In this case, either the primary node or secondary node may try to reconfigure the SL UEs, thus guaranteeing SL service continuity.

Further, in some embodiments, once the network is informed that the SL radio channel has failed, the SL service continuity may be guaranteed by an MN-SN coordination regarding the SL configuration and connectivity handling (e.g., resource coordination, mode transmission, and so on).

Certain embodiments may provide one or more of the following technical advantage(s). For example, methods are proposed herein to specify network and UE behavior in order to handle SL RLF detection and declaration in MR-DC scenarios. According to this, the following advantages may be provided by embodiments disclosed herein:

The SL connectivity is not released upon the detection of an SL RLF.

Upon the SL RLF detection, one of the SL UEs (or both) sends an indication to the network (via the primary or secondary node) by indicating that the SL radio link has failed.

Upon receiving the indication by the SL UE, the primary or secondary node can reconfigure the SL UE to guarantee SL session continuity. This may happen with or without MN-SN coordination.

The network is aware of a failure in the SL connectivity and thus it can manage its own radio resources in an efficient way. If the network is not aware that the SL connectivity is released, the set of radio resources may still continue to be reserved even if not used anymore.

Figure 9:
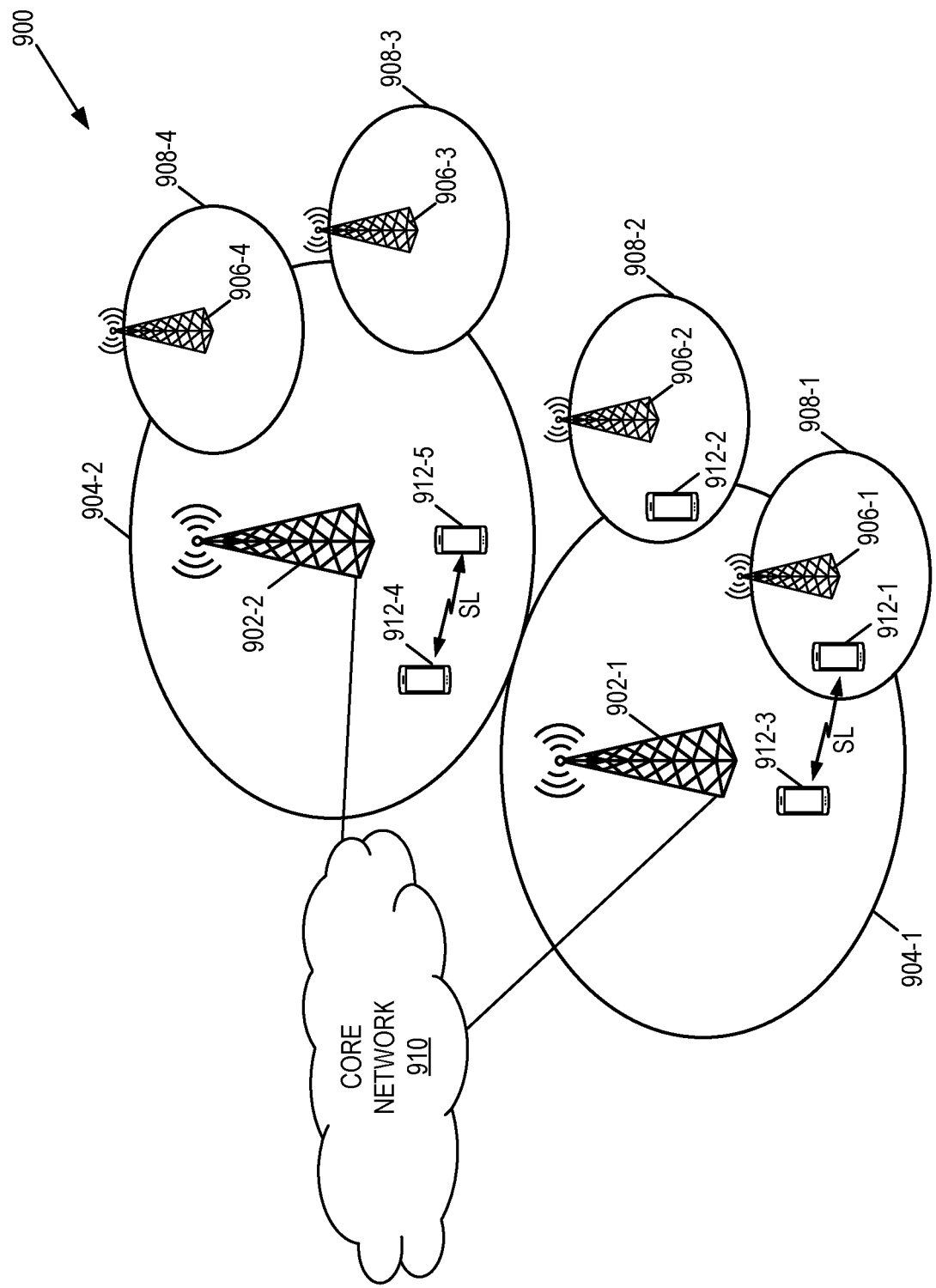
FIG. 9 illustrates one example of a cellular communications system in which embodiments of the present disclosure may be implemented.

In this regard, FIG. 9 illustrates one example of a cellular communications system 900 in which embodiments of the present disclosure may be implemented. In the embodiments described herein, the cellular communications system 900 is, e.g., a 5G System (5GS) including a NR RAN or an Evolved Packet System (EPS) including a LTE RAN. In this example, the RAN includes base stations 902-1 and 902-2, which in LTE are referred to as eNBs and in 5G NR are referred to as gNBs or Next Generation RAN (NG-RAN) nodes, controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910. The base stations 902 (and optionally the low power nodes 906) are connected to the core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

In the embodiments described herein, at least some of the UEs 912 have SLs with other UEs 912. These UEs are also referred to herein as "SL UEs." For example, FIG. 9 illustrates a SL between UE 912-1 and UE 912-3 and another SL between UE 912-4 and UE 912-5. Also, at least some of the UEs 912 are within coverage of the RAN and have cellular links, which are also referred to herein as radio links, such as, e.g., Uu links.

Now, a description of some example embodiments of the present disclosure will be provided. Note that the following embodiments are described for NR, but they may be applied to LTE or any other Radio Access Technology (RAT). Also, the methods and solutions proposed work regardless of the core network used (e.g., Evolved Packet Core (EPC) or 5G CN (5GCN)) and the MR-DC architecture options considered (e.g., Evolved Universal Terrestrial Radio Access Network (E-UTRAN) NR Dual Connectivity (DC) (EN-DC), NR Evolved Universal Terrestrial Radio Access (E-UTRA) DC (NE-DC), NG-RAN E-UTRA NR-DC (NGEN-DC), or NR-DC).

When MR-DC operations are configured, SL transmissions between two (or more) SL UEs (e.g., UE 912-1 and UE 912-3 or UE 912-4 and UE 912-5) may be totally controlled by the network (i.e., SL mode 1 transmission) or may operate autonomously without the help of the network (i.e., SL mode 2 transmission). Note that the latter case does not imply necessarily that all the SL UEs involved in the transmissions are out-of-coverage, rather one or more UEs may be still be in a network coverage by operating in SL mode 2.

In one embodiment, both SL UEs perform radio link monitoring of the SL radio channel between those SL UEs. In another embodiment, only the transmitting (TX) SL UE performs radio link monitoring of the SL radio channel. Yet, in another embodiment, only the receiving (RX) SL UE performs radio link monitoring of the SL radio channel.

In an alternative embodiment, in case of SL mode 1 (i.e., network controlled), SL radio link monitoring is performed on the network side via feedback (e.g., periodic feedback) from the SL UEs to the network regarding connectivity, e.g., on the SL channel. This feedback is also referred to herein as feedback of SL channel conditions. In one embodiment, the feedback of the SL channel conditions is sent by the SL UEs to the network via an explicit RRC message or procedure. In another embodiment, the feedback of the SL channel conditions is sent by the SL UEs to the network via an existing RRC message or procedure (i.e., this means that an existing RRC message or procedure is enhanced to include feedback on the SL channel conditions).

In one embodiment, an SL RLF is detected when one of the following (but not limited to) conditions or criteria occur:
- Expiry of a timer started after indication of radio problems (e.g., Out of Sync) from the physical layer; or
- Maximum number of RLC retransmission is reached; or
- Maximum number of consecutive Hybrid Automatic Repeat Request (HARQ) Negative Acknowledgement (NACK) feedbacks is reached; or
- Channel Busy Ratio (CBR) is higher than a threshold value; or
- Upon a failure to decode correctly an RRC message from the network; or
- Expiry of a timer that is started by the network upon the reception of a feedback regarding the SL radio channel conditions.

In one embodiment, upon detecting SL RLF, the TX SL UE sends an indication to the network in order to inform the network about the detected SL RLF. In another embodiment, upon detecting SL RLF, the RX SL UE sends an indication to the network in order to inform the network about the detected SL RLF.

In another embodiment, upon detecting SL RLF, both the TX and RX SL UEs send an indication (separately) to the network in order to inform the network about the detected SL RLF. Yet, in an alternative embodiment, upon detecting SL RLF, the TX SL UE sends an indication to the network that informs the network of the SL RLF and, at the same time, informs the RX SL UE that the indication was sent. Further, in one embodiment, upon detecting SL RLF, the RX SL UE sends an indication to the network that informs that network of the SL RLF and, at the same time, informs the TX SL UE that the indication was sent.

In another embodiment, the indication sent by the SL UE(s) to indicate the SL RLF to the network is an existing RRC message, e.g., FailureInformation, SCGFailureInformation, or MCGFailureInformation. In one embodiment, the indication sent by the SL UE(s) to indicate the SL RLF to the network is a new RRC message, e.g., SLFailureInformation or SLRlfReport. Yet, in another embodiment, the new RRC message is used only in SL or can be used by any other RATs (e.g., NR or LTE).

In one embodiment, in case of SL mode 1 operating in MR-DC scenarios, when an SL RLF is experienced, the SL UE (or both SL UEs) sends the indication to the primary node via SRB1. Alternatively, in another embodiment, in case of SL mode 1 operating in MR-DC scenarios, when an RLF is experienced the SL UE (or both SL UEs) sends the indication to the secondary node via SRB1 embedding it into a Master Cell Group (MCG) RRC message. Yet, in another embodiment, in case of SL mode 1 operating in MR-DC scenarios, when an RLF is experienced the SL UE (or both SL UEs) sends the indication to the secondary node via SRB3 (if available).

In another embodiment, in case of SL mode 2 operating in MR-DC scenarios, when a SL RLF is experienced, the SL UE (or both SL UEs) triggers the RRC procedure (e.g., RRCSetupRequest or RRCResumeRequest) to enter in RRC_CONNECTED state and, if this succeeds, sends an indication to the network that the SL radio link has failed. In one embodiment, the SL UE (or both SL UEs) operating in SL mode 2, upon successfully entering RRC_CONNECTED, sends the indication to the primary node via the SRB1. Yet, in another embodiment, the SL UE (or both SL UEs) operating in SL mode 2, upon successfully entering RRC_CONNECTED sends the indication to the secondary node via the SRB1 by embedding it in an MCG RRC message. Further, in an alternative embodiment, the SL UE (or both SL UEs) operating in SL mode 2, upon successfully entering RRC_CONNECTED sends the indication to the secondary node via the SRB3 (if configured).

In one embodiment, the SL UE (or both SL UEs) triggers a setup or resume procedure to enter RRC_CONNECTED towards the primary node (i.e., via SRB1). Alternatively, in another embodiment, the SL UE (or both SL UEs) triggers a setup or resume procedure to enter RRC_CONNECTED towards the secondary node (i.e., via SRB3). Yet, in one embodiment, the SL UE (or both SL UEs) triggers a setup or resume procedure to enter RRC_CONNECTED toward the secondary node via SRB1 by embedding the request in an MCG RRC message.

In another embodiment, the RRC message (i.e., new RRC message or existing one) that the UE sends to the network to indicate that a SL RLF has been detected includes any one or more of the following information (but not limited to):
- Identifiers, e.g. involved source L2 Identity (ID) and destination L2 ID, of the SL link where RLF is declared.
- The reason of the SL RLF (e.g., failureType), e.g. Out of Sync, reached maximum number of RLC retransmissions, reached maximum number of consecutive HARQ NACK feedbacks, high CBR, or reconfiguration error.
- Identifiers of the services currently running on the link.
- The authorized/interested frequencies to operate the SL services.
- Any available measurement.

In one embodiment, upon detecting SL RLF, the SL UE (or both of SL UEs) starts a timer and waits to determine if the SL connectivity is restored before the timer expires. The SL UE(s) then sends the indication to the network of an SL RLF if the SL connectivity is not restored before the timer expires. In another embodiment, the timer is an existing timer, such as T310, with a value that is configured specifically for SL. Yet, in another embodiment, the timer is an existing timer, such as T310, with a value that is the same as for NR Uu. In an alternative embodiment, the timer is a new timer that is used for SL RLF detection.

In another embodiment, upon detecting SL RLF, the SL UE (or both of SL UEs) releases the SL connectivity. Yet, in one embodiment, upon detecting SL RLF, the SL UE (or both of SL UEs) releases the SL connectivity and informs the primary node of the SL RLF and/or the release of the SL connectivity. Further, in another embodiment, upon detecting SL RLF, the SL UE (or both of SL UEs) releases the SL connectivity and informs the secondary node of the SL RLF and/or the release of the SL connectivity. Alternatively, in another embodiment both the primary and secondary nodes are informed of the SL RLF and/or the release of the SL connectivity.

In another embodiment, the described methods may be executed independently by both the UEs involved in the SL transmission (i.e., SL UE1 912-1 or SL UE2 912-2). Alternatively, in another embodiment, the described methods are executed by only one of the two UEs involved in the SL transmission.

In one embodiment, upon receiving the SL RLF indication from the SL UE, the primary network node (e.g., the Master Node (MN)) sends a response (i.e., RRC message) to the SL UE that has sent the SL RLF indication with the action to be performed (e.g., SL Radio Bearer (SLRB) reconfiguration, new resource pool, or new transmission mode). Yet, in another embodiment, upon receiving the SL RLF indication from the SL UE, the primary network node (e.g., the MN) forwards the SL RLF indication to the secondary node (e.g., the SN) via inter-node RRC messages. Note that, in some embodiments, the primary node guarantees that the action to be performed is sent only to one of the SL UEs to avoid a race condition or overlapping in the RRC messages.

In another embodiment, upon receiving the SL RLF indication from the SL UE, the secondary network node (e.g., the SN) forwards the RRC message to the primary node (e.g., the MN) via inter-node RRC messages. Yet, in another embodiment, upon receiving the SL RLF indication from the SL UE(s), the secondary network node (e.g., the Secondary Node (SN)) forwards the SL RLF indication to the primary node (e.g., the MN) via inter-node RRC messages. Note that, in some embodiments, the primary node guarantees that the action to be performed is sent only to one of the SL UEs to avoid a race condition or overlapping in the RRC messages.

In an alternative embodiment, upon receiving the SL RLF indication from the primary node (e.g., the MN), the secondary network node (e.g., the SN) sends a message to the primary node with the action that the SL UE needs to perform. Then the primary node will proceed to forward the message to the SL UE (e.g., by embedding it in an MCG RRC message sent to the SL UE via SRB1). Yet, in one embodiment, upon receiving the SL RLF indication from the primary node (e.g., the MN), the secondary network node (e.g., the SN) sends a direct RRC message with action to be performed to the SL UE, e.g., via the SRB3. Note that, in some embodiments, the primary node guarantees that the action to be performed is sent only to one of the SL UEs to avoid a race condition or overlapping in the RRC messages.

In another embodiment, upon receiving the SL RLF indication from the secondary node (e.g., the SN), the primary network node (e.g., the MN) sends a message to the secondary node with the action that the SL UE needs to perform. Then the secondary node forwards the message to the SL UE (e.g., by embedding it in an Secondary Cell Group (SCG) RRC message to the SL UE via SRB3). Yet, in one embodiment, upon receiving the SL RLF indication from the secondary node, the primary network node sends a direct RRC message with the action to be performed to the SL UE, e.g., via SRB1. Note that, in some embodiments, the primary node guarantees that the action to be performed is sent only to one of the SL UEs to avoid a race condition or overlapping in the RRC messages.

In an alternative embodiment, upon receiving the SL RLF indication from the SL UE, the primary node does not perform any actions. Yet, in another embodiment, upon receiving the SL RLF indication from the SL UE, the secondary node does not perform any actions.

In one embodiment, upon receiving the action to be performed from the network, the SL UE applies the configuration (e.g., SLRB configuration or Quality of Service (QoS) mapping rule) received. In another embodiment, upon receiving the action to be performed from the network, the SL UE performs no action and releases the SL connectivity. Yet, in one embodiment, upon receiving the action to be performed from the network, the SL UE goes to RRC_IDLE/RRC_INACTIVE (if the current status is RRC_CONNECTED).

Figure 10A:
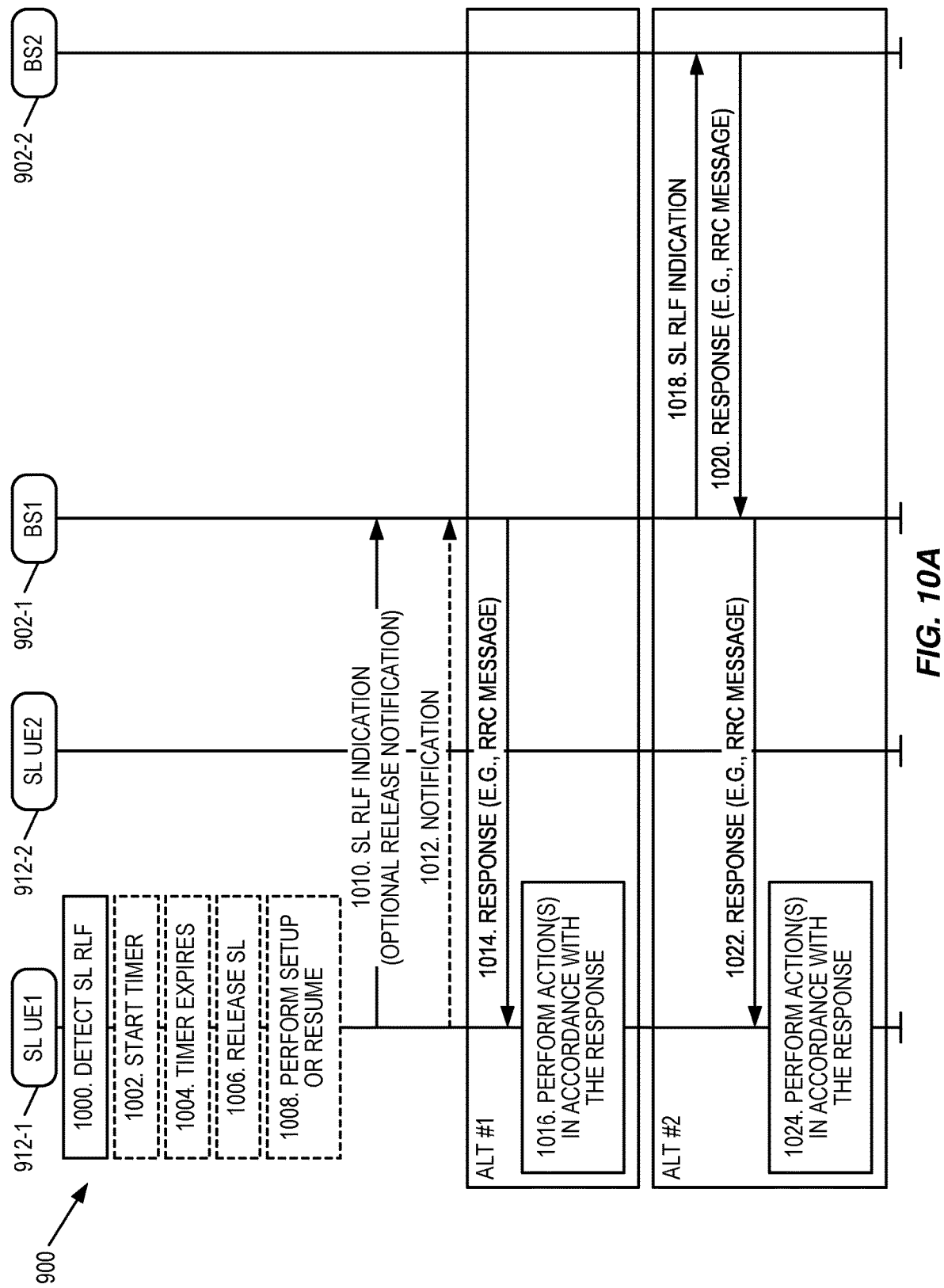
FIGS. 10A and 10B illustrate the operation of the cellular communications system of FIG. 9 in accordance with at least some aspects of at least some of the embodiments described herein.
Figure 10B:
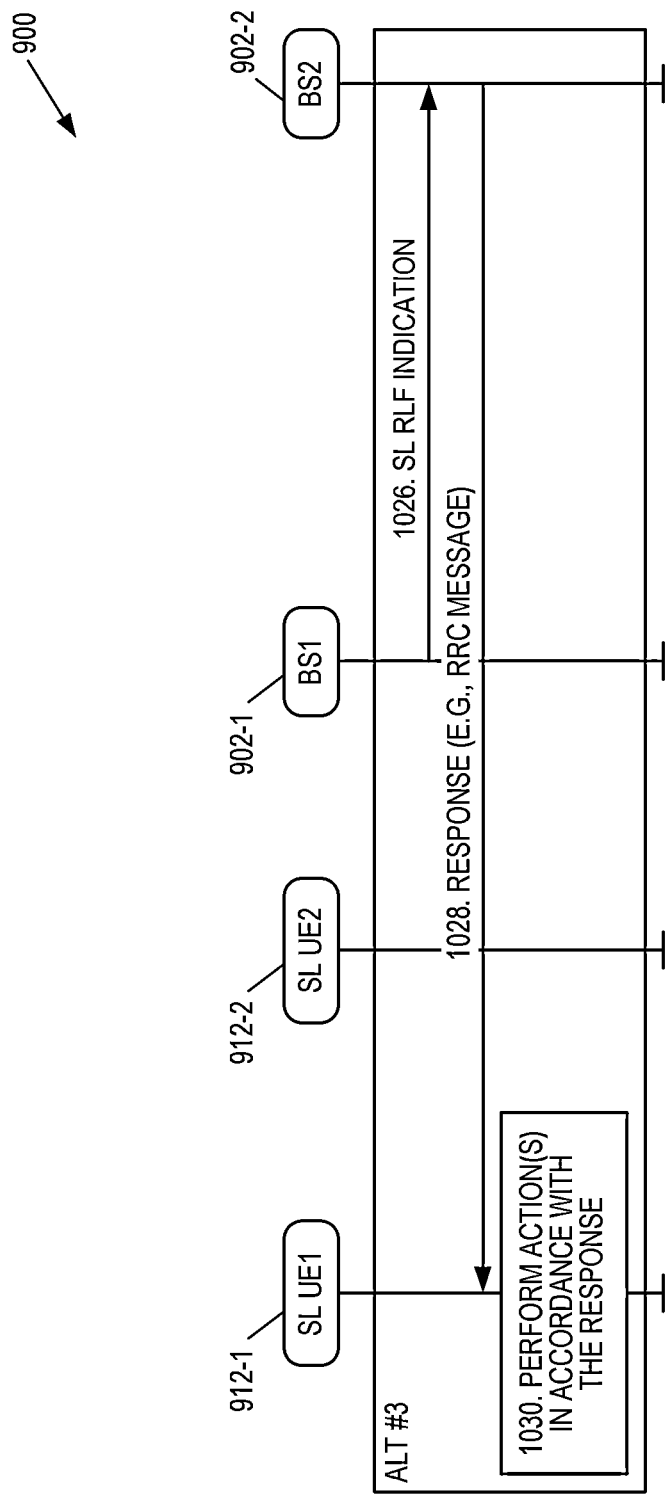

FIGS. 10A and 10B illustrate the operation of the cellular communications system of FIG. 9 in accordance with at least some aspects of at least some of the embodiments described above. As illustrated, a first SL UE (denoted as SL UE1 912-1) has an SL with a second SL UE (denoted as SL UE2 912-2). SL UE1 912-1 detects an SL RLF for the SL between SL UE1 912-1 and SL UE2 912-2 (step 1000). Optionally, in some embodiments, SL UE1 912-1 starts a timer upon detecting the SL RLF (step 1002). If SL connectivity is restored before the timer expires, then SL UE1 912-1 does not proceed with the procedure of FIGS. 10A and 10B. However, if the timer expires (step 1004), the SL UE1 912-1 proceeds with the illustrated procedure. Optionally, once the timer has expired and SL connectivity has not been restored (if optional steps 1002 and 1004 are performed), SL UE1 912-1 optionally releases the SL with SL UE2 912-2 (step 1006). Also, as discussed above, in some embodiments, in order to send an indication of the SL RLF to the network, SL UE1 912-1 performs a setup or resumes procedure to setup or resume a connection with the network (step 1008).

As discussed above, SL UE1 912-1 sends an SL RLF indication to the network (step 1010). In this example, SL UE1 912-1 sends the SL RLF indication to a first base station (denoted as BS1 902-1). Depending on the particular embodiment, BS1 902-1 may be, for example, a MN of SL UE1 912-1 or a SN of SL UE1 912-1. Various embodiments of how SL UE1 912-1 sends the SL RLF indication to the network, the contents of the SL RLF indication, etc. are described above. Any of those embodiments may be used here. Optionally, if SL UE1 912-1 has released the SL, SL UE1 912-1 may also notify the network of the release, as described above. Optionally, SL UE1 912-1 notifies SL UE2 912-2 that it has sent the SL RLF indication to the network (step 1012).

While not shown, note that, in some embodiments, SL UE2 912-2 may also perform any one or more of steps 1000-1012.

As discussed above, in a first set of alternative embodiments (denoted ALT #1), BS1 902-1 sends a response to SL UE1 912-1 (step 1014). Various embodiments are described above relating how the network node (e.g., the MN or SN) that receives the SL RLF indication from the SL UE(s) responds to the SL UE(s). Any of those embodiments may be used here. The response may be, for example, an RRC message that triggers or otherwise causes SL UE1 912-1 to perform one or more actions, as discussed above (step 1016).

As also discussed above, in a second set of alternative embodiments (denoted ALT #2), BS1 902-1 sends the SL RLF indication to another radio access node, denoted here as BS2 902-2 (step 1018). BS2 902-2 then sends a response to BS1 902-1 (step 1020), and BS1 902-1 forwards the response to SL UE1 912-1 (step 1022). Various embodiments are described above relating how the network node (e.g., the MN or SN) that receives the SL RLF indication from the SL UE(s) sends the SL RLF indication to another network node (e.g., SN or MN) that then generates a response and sends the response back to the network node, which then forwards the response to the SL UE(s). Any of those embodiments may be used here. The response may be, for example, an RRC message that triggers or otherwise causes SL UE1 912-1 to perform one or more actions, as discussed above (step 1024).

As also discussed above, in a third set of alternative embodiments (denoted ALT #3), BS1 902-1 sends the SL RLF indication to another radio access node, denoted here as BS2 902-2 (step 1026). BS2 902-2 then sends a response to SL UE1 912-1 (step 1028). Various embodiments are described above relating how the network node (e.g., the MN or SN) that receives the SL RLF indication from the SL UE(s) sends the SL RLF indication to another network node (e.g., SN or MN) that then generates a response and sends the response back to the SL UE(s). Any of those embodiments may be used here. The response may be, for example, an RRC message that triggers or otherwise causes SL UE1 912-1 to perform one or more actions, as discussed above (step 1030).

Figure 11:
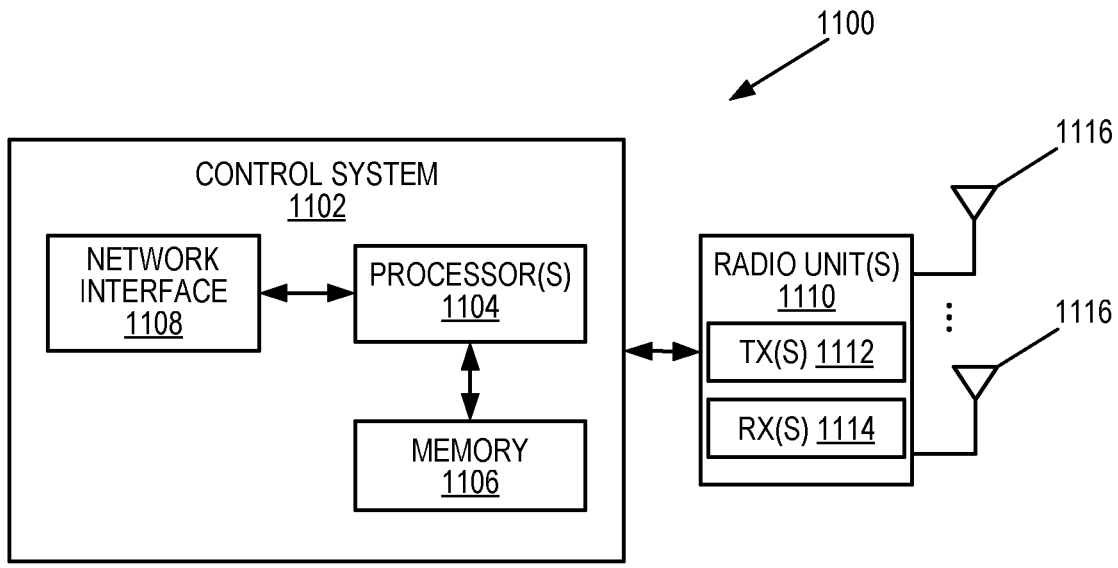
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 902 or 906. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a BS1 902-1 or BS2 902-2 described above with respect to FIGS. 10A and 10B). In some embodiments, the function(s) are implemented in software that is stored, e.g., in the memory 1106 and executed by the one or more processors 1104.

Figure 12:
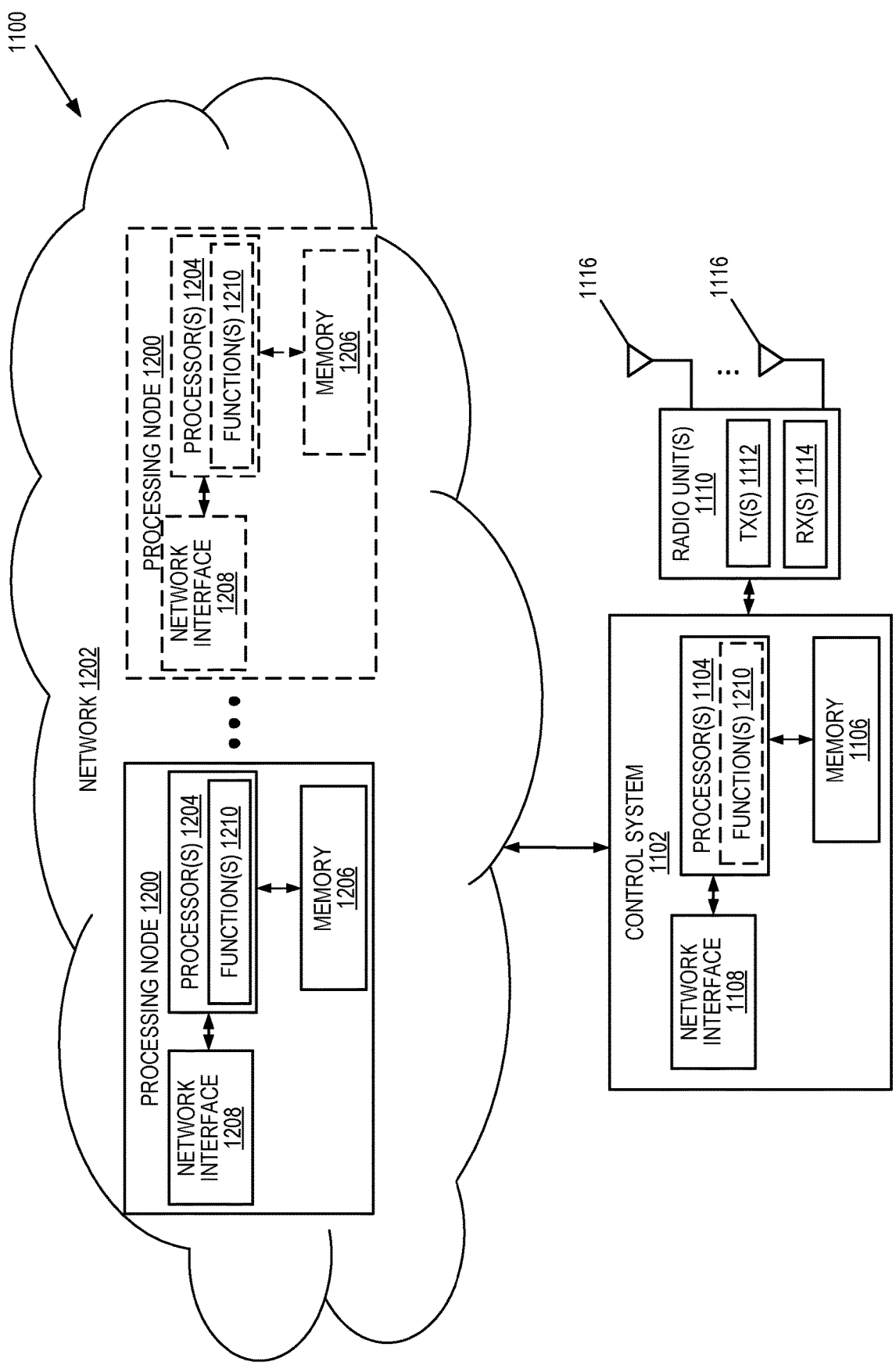
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a BS1 902-1 or BS2 902-2 described above with respect to FIGS. 10A and 10B) are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
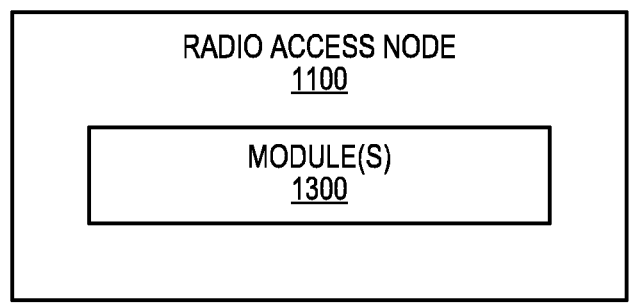
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a BS1 902-1 or BS2 902-2 described above with respect to FIGS. 10A and 10B). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
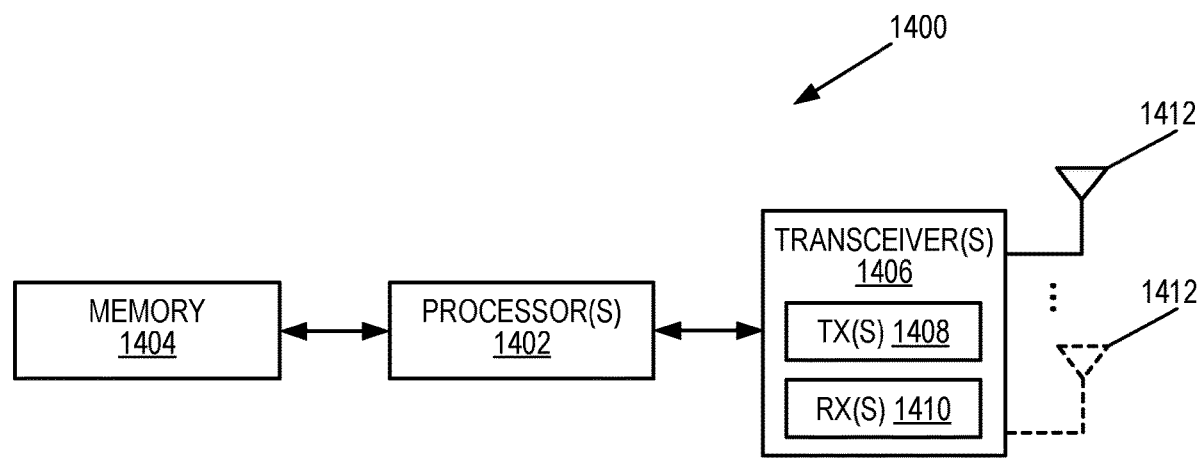
FIG. 14 is a schematic block diagram of a UE according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above (e.g., one or more functions of a SL UE1 912-1 or SL UE2 912-2 described above with respect to FIGS. 10A and 10B) may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein (e.g., one or more functions of a SL UE1 912-1 or SL UE2 912-2 described above with respect to FIGS. 10A and 10B) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
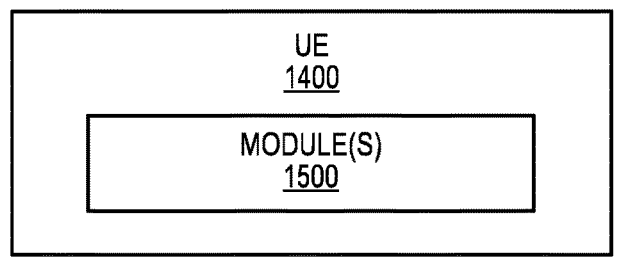
FIG. 15 is a schematic block diagram of the UE according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein (e.g., one or more functions of a SL UE1 912-1 or SL UE2 912-2 described above with respect to FIGS. 10A and 10B).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

In the following, further exemplary embodiments are listed:

Embodiment 1: A method performed by a first wireless device for detecting and handling a SL RLF in a cellular communications system, the method comprising: detecting (1000) a SL RLF for a sidelink between the first wireless device and a second wireless device; and sending (1010) a SL RLF indication to a radio access node in a radio access network of the cellular communications system.

Embodiment 2: The method of embodiment 1 further comprising: starting (1002) a timer upon detecting (1000) the SL RLF; and determining (1004) that the timer has expired without the sidelink being restored; wherein sending (1010) the SL RLF indication to the radio access node comprises sending (1010) the SL RLF indication to the radio access node upon determining (1004) that the timer has expired without the sidelink being restored.

Embodiment 3: The method of embodiment 1 or 2 further comprising performing (1008) a setup or resume procedure to setup or resume a connection with the radio access node.

Embodiment 4: The method of any one of embodiments 1 to 3 further comprising releasing (1006) the sidelink.

Embodiment 5: The method of embodiment 4 further comprising notifying (1010) the radio access node that that the sidelink has been released.

Embodiment 6: The method of any one of embodiments 1 to 5 further comprising sending (1012) a notification to the second wireless device, the notification being an indication that the first wireless device has sent the SL RLF to the radio access node.

Embodiment 7: The method of any one of embodiments 1 to 6 wherein sending (1010) the SL RLF indication to the radio access node comprises sending (1010) a RRC message comprising the SL RLF indication to the radio access node.

Embodiment 8: The method of embodiment 7 wherein the RRC message comprises FailureInformation, SCGFailureInformation, or MCGFailureInformation, and the SL RLF indication is comprised in the FailureInformation, SCGFailureInformation, or MCGFailureInformation.

Embodiment 9: The method of embodiment 7 wherein the RRC message is a RRC message used only for sidelink related procedures.

Embodiment 10: The method of any one of embodiments 1 to 9 wherein the SL RLF indication comprises any one or more of the following information: one or more identifiers associated with the sidelink (e.g., involved source L2 Identity, ID, and/or destination L2 ID of the sidelink where RLF is declared); information that indicates a reason of the SL RLF (e.g., failureType), e.g. Out of Sync, reached maximum number of Radio Link Control, RLC, retransmissions, reached maximum number of consecutive HARQ NACK feedbacks, high CBR or reconfiguration error; one or more identifiers of one or more services running on the sidelink at the time of the SL RLF; one or more authorized or interested frequencies to operate SL services for the sidelink; or one or more measurements related to the sidelink.

Embodiment 11: The method of any one of embodiments 1 to 10 further comprising: receiving (1014, 1022) a response from the radio access node that triggers one or more actions; and performing (1016, 1024) the one or more actions.

Embodiment 12: The method of any one of embodiments 1 to 10 further comprising: receiving (1028) a response from another radio access node that triggers one or more actions related to handle the SL RLF; and performing (1030) the one or more actions.

Embodiment 13: The method of any one of embodiments 1 to 12 wherein the radio access node is a primary node of the first wireless device (e.g., a MN of the first wireless device or a radio access node serving a Primary Cell (PCell) of the first wireless device).

Embodiment 14: The method of any one of embodiments 1 to 12 wherein the radio access node is a secondary node of the first wireless device (e.g., a SN of the first wireless device or a radio access node serving a Secondary Cell (SCell) of the first wireless device).

Embodiment 15: A method performed by a base station for handling a SL RLF of a sidelink between a first wireless device and a second wireless device, the method comprising: receiving (1010) an SL RLF indication from a first wireless device, the SL RLF indication being an indication of an SL RLF for a sidelink between the first wireless device and the second wireless device.

Embodiment 16: The method of embodiment 15 further comprising sending (1014) a response to the first wireless device that triggers one or more actions for handling the SL RLF.

Embodiment 17: The method of embodiment 15 further comprising: sending (1018) the SL RLF indication to another network node; receiving (1020) a response from the other network node; and sending (1022) the response to the first wireless device, the response being a response that triggers one or more actions for handling the SL RLF.

Embodiment 18: The method of embodiment 15 further comprising sending (1018) the SL RLF indication to another network node.

Embodiment 19: The method of any one of embodiments 15 to 18 further comprising receiving (1010), from the first wireless device, a notification that the first wireless device has released the sidelink.

Embodiment 20: The method of any one of embodiments 15 to 19 wherein receiving (1010) the SL RLF indication comprises receiving (1010) a RRC message comprising the SL RLF indication.

Embodiment 21: The method of embodiment 20 wherein the RRC message comprises Fail ureInformation, SCGFailureInformation, or MCG Fail ureInformation, and the SL RLF indication is comprised in the Failure-Information, SCGFailureInformation, or MCGFailureInformation.

Embodiment 22: The method of embodiment 20 wherein the RRC message is an RRC message used only for sidelink related procedures.

Embodiment 23: The method of any one of embodiments 15 to 22 wherein the SL RLF indication comprises any one or more of the following information: one or more identifiers associated with the sidelink (e.g., involved source L2 Identity, ID, and/or destination L2 ID of the sidelink where RLF is declared); information that indicates a reason of the SL RLF (e.g., failureType), e.g. Out of Sync, reached maximum number of RLC retransmission, reached maximum number of consecutive HARQ NACK feedbacks, high CBR or reconfiguration error; one or more identifiers of one or more services running on the sidelink at the time of the SL RLF; one or more authorized or interested frequencies to operate SL services for the sidelink; or one or more measurements related to the sidelink.

Embodiment 24: The method of any one of embodiments 15 to 23 wherein the base station is a primary node of the first wireless device (e.g., a MN of the first wireless device or a radio access node serving a PCell of the first wireless device).

Embodiment 25: The method of any one of embodiments 15 to 23 wherein the radio access node is secondary node of the first wireless device (e.g., a SN of the first wireless device or a radio access node serving a SCell of the first wireless device).

Embodiment 26: A method performed by a base station for handling a SL RLF of a sidelink between a first wireless device and a second wireless device, the method comprising: receiving (1026) an SL RLF indication from another network node, the SL RLF indication being an indication of an SL RLF for a sidelink between the first wireless device and the second wireless device.

Embodiment 27: A wireless device comprising: processing circuitry configured to perform any of the steps of any of the Group A embodiments; and power supply circuitry configured to supply power to the wireless device.

Embodiment 28: A base station comprising: processing circuitry configured to perform any of the steps of any of the Group B embodiments; and power supply circuitry configured to supply power to the base station.

Embodiment 29: A UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure:

3GPP Third Generation Partnership Project
5G Fifth Generation
5GCN Fifth Generation Core Network
5GS Fifth Generation System
ACK Acknowledgement
AM Acknowledged Mode
AMF Access and Mobility Function
ASIC Application Specific Integrated Circuit
AUSF Authentication Server Function
BSR Buffer Status Report
CA Carrier Aggregation
CBR Channel Busy Ratio
C-ITS Cellular Intelligent Transport Systems
CN Core Network
CP Control Plane
CPU Central Processing Unit
D2D Device-to-Device DC Dual Connectivity
DCI Downlink Control Information
DSP Digital Signal Processor
eNB Enhanced or Evolved Node B
EN-DC Evolved Universal Terrestrial Radio Access Network New Radio Dual Connectivity
eLTE Enhanced Long Term Evolution
EPC Evolved Packet Core
EPS Evolved Packet System
E-UTRA Evolved Universal Terrestrial Radio Access
E-UTRAN Evolved Universal Terrestrial Radio Access Network
eV2X Enhanced Vehicle-to-Everything
FPGA Field Programmable Gate Array
gNB New Radio Base Station
HARQ Hybrid Automatic Repeat Request
HSS Home Subscriber Server
ID Identity
ITS Intelligent Transport Systems
LTE Long Term Evolution
MAC Medium Access Control
MC Multi-Connectivity
MCG Master Cell Group
MeNB Master Enhanced or Evolved Node B
MgNB Master New Radio Base Station
MME Mobility Management Entity
MN Master Node
MR-DC Multi-Radio Dual Connectivity
MTC Machine Type Communication
NACK Negative Acknowledgement
NE-DC New Radio Evolved Universal Terrestrial Radio Access Dual Connectivity
NEF Network Exposure Function
NF Network Function
NG-eNB Next Generation Enhanced or Evolved Node B
NGEN-DC Next Generation Radio Access Network Evolved Universal Terrestrial Radio Access New Radio Dual Connectivity
NG-RAN Next Generation Radio Access Network
NR New Radio
NRF Network Function Repository Function
NSSF Network Slice Selection Function
OEM Original Equipment Manufacturer
PCF Policy Control Function
PCell Primary Cell
PDCCH Physical Downlink Control Channel
PDU Protocol Data Unit
P-GW Packet Data Network Gateway
PSCCH Physical Sidelink Control Channel
PSSCH Physical Sidelink Shared Channel
QoS Quality of Service
RA Resource Allocation
RAM Random Access Memory
RAN Radio Access Network
RAT Radio Access Technology
Rel Release
RLC Radio Link Control
RLF Radio Link Failure
ROM Read Only Memory
RRC Radio Resource Control
RRH Remote Radio Head
RSU Road Side Unit
RX Receiving
SA Stand-Alone
SCEF Service Capability Exposure Function
SCG Secondary Cell Group
SCell Secondary Cell
SCI Sidelink Control Information
SeNB Secondary Enhanced or Evolved Node B
SgNB Secondary New Radio Base Station
SIB System Information Block
SL Sidelink
SLRB Sidelink Radio Bearer
SMF Session Management Function
SN Secondary Node
SRB Signaling Radio Bearer
TB Transport Block
TR Technical Report
TS Technical Specification
TX Transmitting
UDM Unified Data Management
UE User Equipment
UM Unacknowledged Mode
UP User Plane
UPF User Plane Function
URLLC Ultra Reliable Low Latency Communications
V2I Vehicle-to-Infrastructure
V2P Vehicle-to-Pedestrian
V2V Vehicle-to-Vehicle
V2X Vehicle-to-Everything

The invention claimed is:

1. A method performed by a second base station for handling a sidelink Radio Link Failure (RLF) of a sidelink between a first wireless device and a second wireless device, the method comprising:
    receiving a sidelink RLF indication from a first base station, the sidelink RLF indication being an indication of a sidelink RLF at a first wireless device for a sidelink between the first wireless device and the second wireless device; and
    sending a response directly to the first wireless device that triggers one or more actions for handling the sidelink RLF.

2. The method of claim 1, wherein the one or more actions for handling the sidelink RLF comprises one or more of the following actions to be performed by the first wireless device:
    applying a sidelink Radio Bearer (SLRB) configuration;
    applying a Quality of Service (QOS) mapping rule;
    using a new resource pool; or
    using a new transmission mode.

3. The method of claim 1, wherein sending the response comprises sending the response to the first base station to be further forwarded to the first wireless device.

4. The method of claim 1, wherein sending the response comprises sending the response to the first wireless device.

5. The method of claim 1, further comprising performing a setup or resume procedure with first wireless device to setup or resume a connection.

6. The method of claim 5, further receiving from the first wireless device a notification that that the sidelink has been released.

7. The method of claim 1, wherein receiving the sidelink RLF indication comprises receiving a Radio Resource Control (RRC) message comprising the sidelink RLF indication.

8. A radio access node for handling a sidelink Radio Link Failure (RLF) of a sidelink between a first wireless device and a second wireless device, the radio access node comprising processing circuitry configured to cause the radio access node to:
    receiving a sidelink RLF indication from a first wireless device, the sidelink RLF indication being an indication of a sidelink RLF for a sidelink between the first wireless device and the second wireless device; and sending the sidelink RLF indication to a second base station to handle the sidelink RLF directly with the first wireless device.

\* \* \* \* \*